United States Patent [19]

Tanaka

[11] Patent Number: 5,785,482
[45] Date of Patent: Jul. 28, 1998

[54] APPARATUS FOR CORRECTING LOAD APPEARANCE

[75] Inventor: Nobuhiro Tanaka, Saitama, Japan

[73] Assignee: Kao Corporation, Tokyo, Japan

[21] Appl. No.: 634,027

[22] Filed: Apr. 17, 1996

Related U.S. Application Data

[62] Division of Ser. No. 178,285, Jan. 10, 1994, Pat. No. 5,567,102.

[30] Foreign Application Priority Data

| May 13, 1992 | [JP] | Japan | 4-146906 |
| May 13, 1992 | [JP] | Japan | 4-146907 |
| May 13, 1992 | [JP] | Japan | 4-146908 |
| May 13, 1992 | [JP] | Japan | 4-146909 |

[51] Int. Cl.⁶ .................................. B65G 1/00
[52] U.S. Cl. .................. 414/270; 414/273; 414/788
[58] Field of Search .................. 414/270, 273, 414/274, 275, 417, 788, 795.9, 796.2, 796.3, 796.4, 907; 901/47

[56] References Cited

U.S. PATENT DOCUMENTS

| 3,139,993 | 7/1964 | Lauer | 414/796.2 |
| 3,342,349 | 9/1967 | Sheldon et al. | 414/796.2 X |
| 4,032,022 | 6/1977 | Smith | 414/796.2 |
| 5,096,369 | 3/1992 | Ouellette | 414/796.4 X |
| 5,163,808 | 11/1992 | Tsubone et al. | 414/907 X |
| 5,169,284 | 12/1992 | Berger et al. | 414/907 X |

FOREIGN PATENT DOCUMENTS

| 43-11122 | 5/1968 | Japan . |
| 50-118472 | 9/1975 | Japan . |
| 51-24182 | 7/1976 | Japan . |
| 57-199798 | 12/1982 | Japan . |
| 60-87108 | 5/1985 | Japan . |
| 3115005 | 5/1991 | Japan . |

*Primary Examiner*—Janice L. Krizek
*Attorney, Agent, or Firm*—Dvorak & Orum

[57] ABSTRACT

A method and apparatus for correcting the appearance of each of a plurality of vertically stacked load stages each comprising a load placed on a pallet. Each of the vertically stacked load stages is separated, and each separated load stage is corrected.

2 Claims, 17 Drawing Sheets

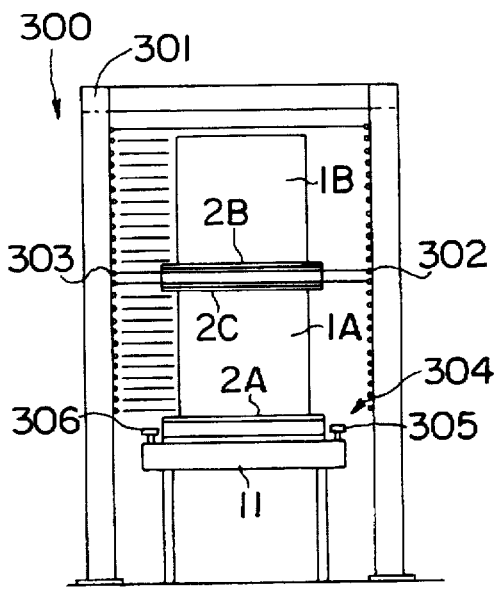
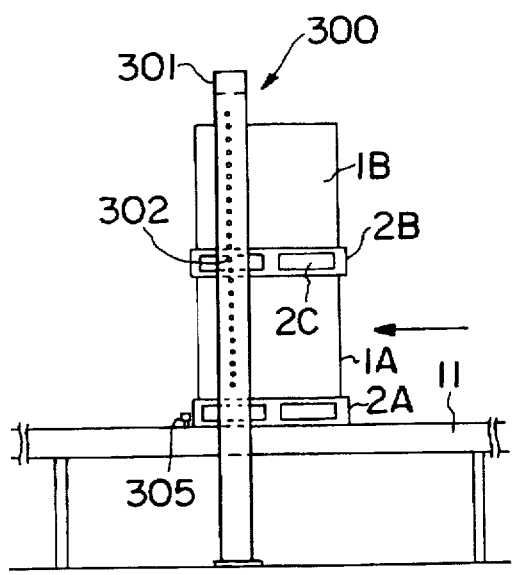
FIG.6A    FIG.6B
| WAY OF HEIGHT DETERMINATION | |
|---|---|
| $h_1$ | |
| $h_2$ | • INCIDENCE OF TWO LIGHT BEAMS ・ INCIDENCE OF THREE LIGHT BEAMS |
| $h_3$-$h_n$ | WHEN THREE OR MORE PL HOLES ARE DETECTED |
| HA | HA = $h_2$ - PL/2 |
| HB | HB = $h_1$ - HA |
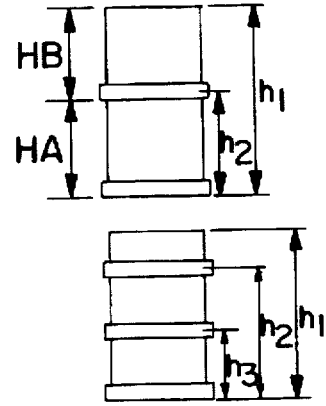
FIG.7

FIG. 9

| LOAD APPEARANCE | a | b | c | d | e | f |
|---|---|---|---|---|---|---|
| (illustration) | A (one stack) | A / A (two stacks same) | A (one stack, shorter) | A / A (two stacks same) | B / A (two stacks different) | B / A (two stacks different) |
| JUDGEMENT CONDITION | ONE STAGE<br>·$h_1 \geq 1350$ | TWO STAGES<br>·$1100 > H_A \geq 800$<br>·$1100 > H_B$<br>UPPER/LOWER STAGE LOADS OF THE SAME KIND | ONE STAGE<br>·$1350 > h_1$ | TWO STAGES<br>·$800 > H_A$<br>·$1100 > H_B$<br>UPPER/LOWER STAGE LOADS OF THE SAME KIND | TWO STAGES<br>·$1100 > H_A \geq 800$<br>·$1100 > H_B$<br>UPPER/LOWER STAGE LOADS OF DIFFERENT KINDS | TWO STAGES<br>·$800 > H_A$<br>·$1100 > H_B$<br>UPPER/LOWER STAGE LOADS OF DIFFERENT KINDS |

| | | | a | b | c | d | e | f |
|---|---|---|---|---|---|---|---|---|
| X-DIRECTION LOAD APPEARANCE CORRECTING UNIT | PL POSITION CORRECTION | UPPER | — | O | — | — | O | — |
| | | LOWER | O | O | O | O | O | O |
| | LOAD APPEARANCE CORRECTION | UPPER | O | O | — | — | O | — |
| | | LOWER | O | O | O | O | O | — |
| Y-DIRECTION LOAD APPEARANCE CORRECTING UNIT | PL POSITION CORRECTION | UPPER | — | O | — | O | O | O |
| | | LOWER | O | O | O | O | O | O |
| | LOAD APPEARANCE CORRECTION | UPPER | O | O | — | O | O | O |
| | | LOWER | O | — | — | — | O | O |
| TWO STAGE DISASSEMBLING | | | — | — | — | — | O | O |

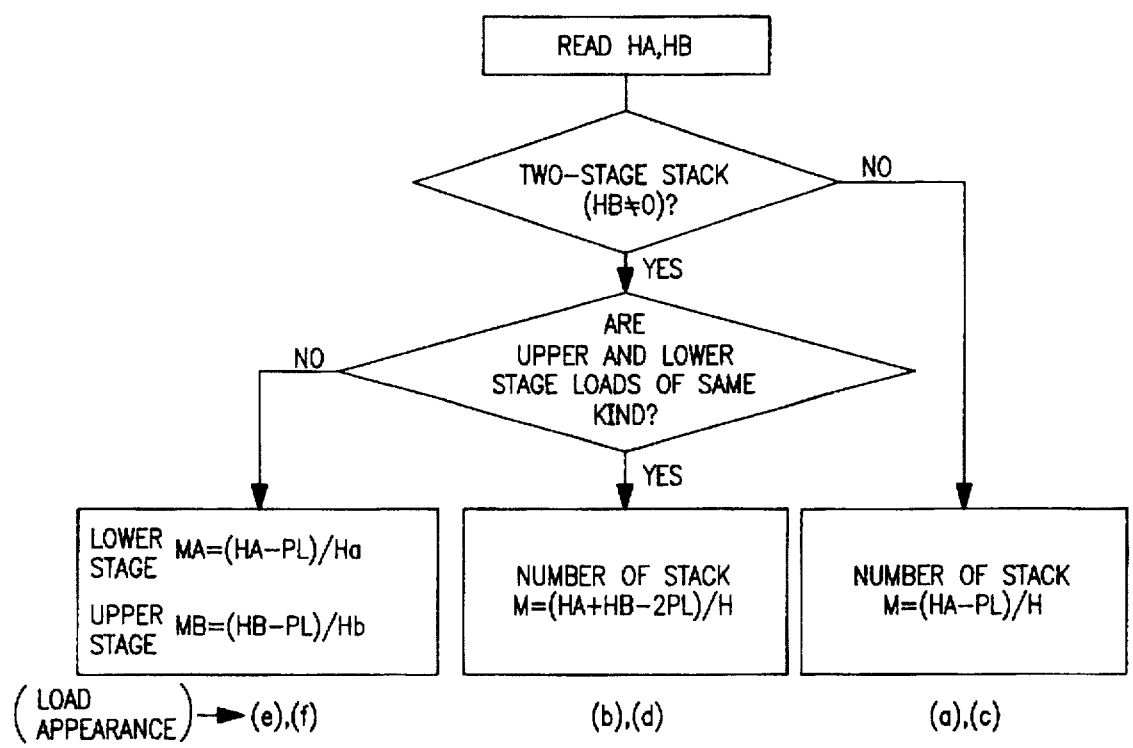
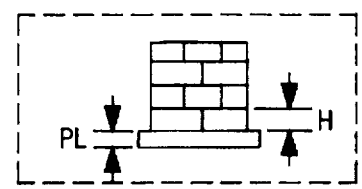
FIG. 11

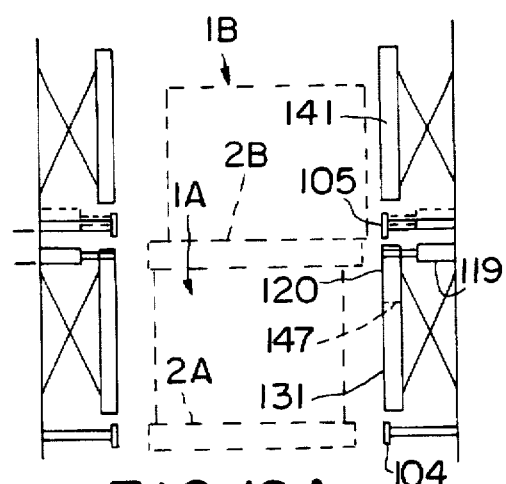
FIG. 12A
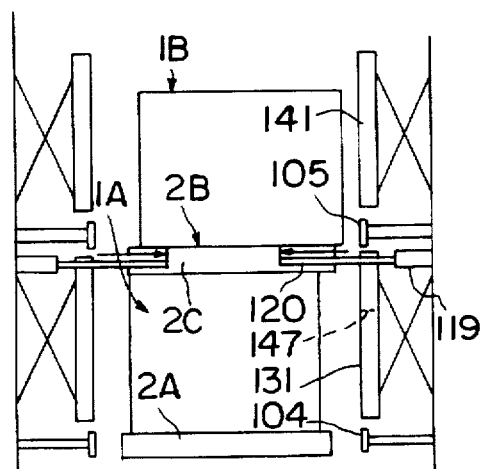
FIG. 12B
FIG. 12C
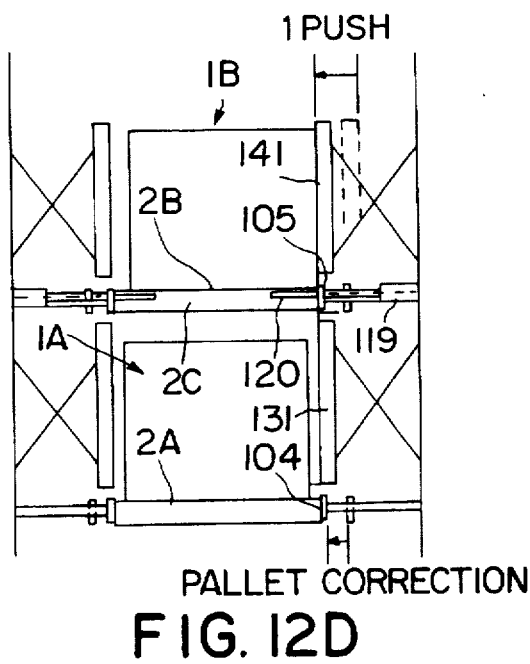
PALLET CORRECTION
FIG. 12D
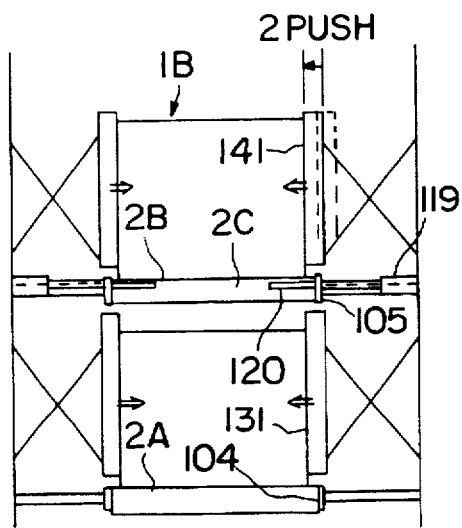
FIG. 12E

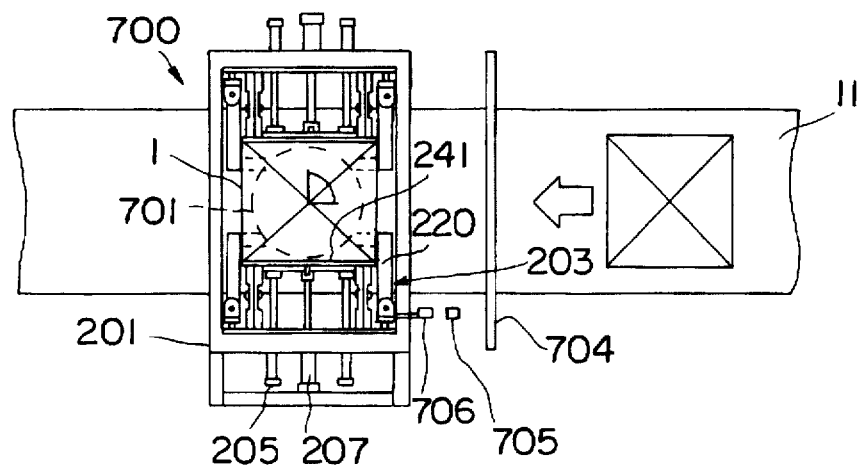
F I G. 17
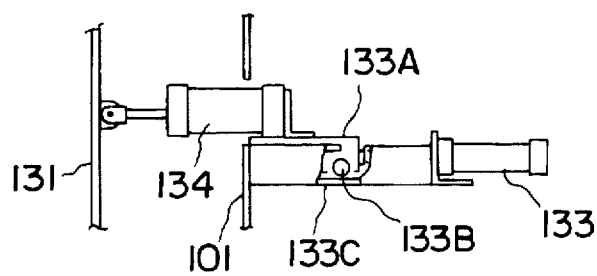
F I G. 18
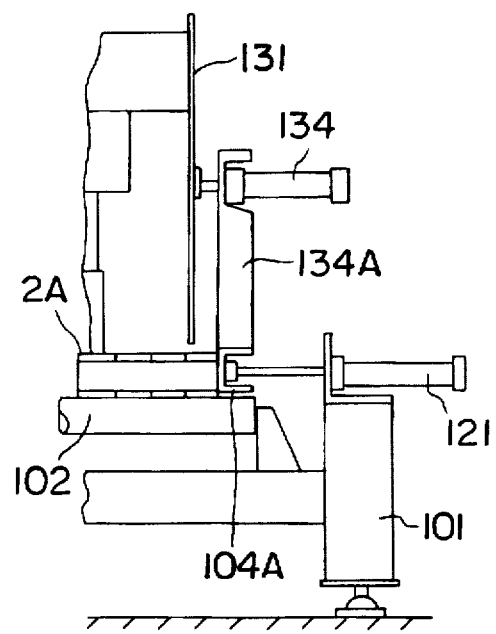
F I G. 19

APPARATUS FOR CORRECTING LOAD APPEARANCE

This is a divisional of application Ser. No. 08/178,285 filed on 10 Jan. 1994, now U.S. Pat. No. 5,567,102.

FIELD OF THE INVENTION

The present invention relates to a method and apparatus or correcting load appearance.

PRIOR ART STATEMENT (A) In a prior art apparatus for load appearance correction, the load appearance is corrected by securing a pallet and clamping and pushing the opposite sides of a load on the pallet with a pair of opposed load appearance correction plates.

In the prior art, however, where a plurality of loads each placed on a pallet as each stage is stacked one above another, the appearance correction of each stage load can not be obtained for the following reasons.

① If the appearance of the vertically stacked loads is to be corrected while the loads are in the stack, lower stage loads on pallets can not be moved freely because of the weight of the upper stage loads exerted on them, and it is possible to cause damage to cardboard boxes as their packing.

② As a load supported on a pallet, usually the load is accommodated within the pallet (i.e., the load has a width smaller than the width of the pallet). Therefore, when the sides of a load on a pallet are to be pushed with the pair load appearance correction plates, the upper stage pallet constitute an obstacle to prevent the pushing of the load sides.

It is an object of the present invention to permit correction of the appearance of a stack of loads each placed on a pallet at each stage.

(B) In another aspect, in distribution centers, loads are prearranged with a load appearance corrector before they are brought into an automatic warehouse.

Loads are transported on trucks in a state that cardboard boxes accommodating them are stacked on pallets (i.e., in a pallet load appearance). When they arrive at the distribution center, therefore, they have been deviated beyond the pallets or about to be crumbled. If they are introduced in this state into the warehouse, they are likely to be crumbled or caught by cranes or shelves as they are conveyed. For this reason, the appearance of the loads is corrected in advance to a proper appearance with a load appearance corrector.

When pallet loads are stacked one above another as individual stages, the stack is disassembled into the individual stage pallet loads for appearance correction thereof one after another with a load appearance corrector, and the appearance corrected pallet loads are then introduced one after another into the warehouse.

In the prior art, however, there are the following problems ① and ②.

① Loads in the stack can not be handled for appearance correction while they are in the stack. Therefore, an operation of disassembling the load stack into individual pallet loads has to be done in front of the load appearance corrector. This means inferior efficiency of in-feeding of the load into the warehouse.

② In the case when individual stage loads in a stack are of the same kind, the stack is disassembled as in ① above for appearance correction of each disassembled pallet load, and the individual appearance corrected loads are stacked again before they are fed in the warehouse. Therefore, the in-feeding efficiency is again inferior.

It is another object of the invention to improve the efficiency of in-feeding appearance corrected loads in a stack into the warehouse.

(C) In a further aspect, in the prior art load appearance corrector the load appearance correction is done by securing a pallet and clamping and pushing the opposite sides of a load that is placed on the pallet with a pair of opposed load appearance correction plates, as shown in FIG. 23. In this case, as pushers for pushing the load appearance correction plates are used those which have a cushioning property such as air cylinders so that the loads can be appearance corrected without being crushed by pushing.

In the prior art, however, the pusher for pushing each load appearance correction plate effects only a single stage of the pushing operation. Therefore, if stacked loads are deviated beyond the pallet as shown in FIG. 22(A), the load appearance correction plate which is on the side of the loads that is found beyond the pallet first strikes the loads. Subsequently, this load appearance correction plates proceeds slowly due to the resistance offered by the loads. During this time, the opposite side load appearance correction plates is advanced to an excessive extent into the pallet. As a result, the clamping of the loads is completed between one load appearance correction plate, which is failing to reach the pallet edge, and the other load appearance correction plate, which has been advanced excessively into the pallet (see FIG. 22(B)). Therefore the appearance corrected set of loads is such that one side of it is getting out of the pallet (see FIG. 22(C)).

It is a further object of the present invention to permit load appearance correction such that the appearance corrected load on a load setting area is reliably held within the width of the load setting area.

(D) In a still further aspect, when feeding loads into the automatic warehouse in distribution centers, the vertical position of a pallet with a load supported thereon may be adjusted for the appearance correction of the load.

As a pallet lift that is used to this end, it is thought to adopt one, which has a pair of opposed lifting bars that are adapted to be inserted through opposite end through holes provided in the pallet and then raised or lowered. When this pallet lift is used, the vertical level of the lifting levels is set for raising and lowering operations to the level of the through holes in the pallet that is determined by pallet load appearance data.

However, the level of the through holes does not always conform to the pallet load appearance data due to the product size accuracy of the pallet, pallet size changes in long use, deformation of the lower stage pallet load appearance, on which the pallet load is placed, etc.

Therefore, it is possible that the lifting levers are operated in a state of deviation from the level of the through holes in the pallet, thus leading-to breakage of the load and also of the apparatus.

It is a still further object of the present invention to ensure reliable insertion of the lifting levers of the pallet lift in the through holes in the pallet for the raising and lowering thereof.

DISCLOSURE OF THE INVENTION (A) According to the present invention, there is provided a method of correcting the appearance of each of a plurality of vertically stacked load stages each comprising a load placed on a pallet, which comprises the steps of separating each of the vertically stacked load stages, and correcting the appearance of each separated load stage.

Further, according to the present invention, there is provided an apparatus for correcting the appearance of each of a plurality of vertically stacked load stages each comprising a load placed on a pallet, which comprises an upper stage pallet lift for raising and lowering an upper stage pallet between a stack position and a load appearance correction position, a pallet securing unit provided for each stage load appearance correction position for securing each stage pallet, and a load appearance correcting unit provided at each stage load correction position for correcting the appearance of each stage pallet load.

Further, according to the present invention, in the apparatus for load appearance correction, the upper stage pallet lift has lifting lever means capable of engagement with and disengagement from a corresponding pallet in an engagement/ disengagement path avoiding the interference with a lower stage load appearance correcting unit.

With the above constructions according to the invention, the following functions are obtainable.

① An upper stage pallet is separated from a lower stage load by raising it, and in this state, the load appearance correction is done. The lower stage load thus can be moved freely, and there is no possibility of causing damage to the load with application thereto of irrational forces.

② The pallet lift raises the upper stage pallet to the load appearance correction position, and the pallet securing unit, load appearance correcting unit are provided at the load appearance correction position for each stage. Thus, each stage load can be appearance corrected by each stage load appearance correcting unit without being obstructed by upper stage pallets.

③ The lifting levers of the upper stage pallet lift engage a corresponding upper stage pallet above a lower stage pallet load in an engagement/disengagement path avoiding interference with the lower stage load appearance correcting unit. Thus, the lifting levers of the upper stage pallet lift can be reliably engaged with the upper stage pallet to raise or lower the same.

(B) According to the present invention, there is provided automatic warehouse equipment for receiving a plurality of vertically stacked load stages each comprising a load placed on a pallet by using the method of load appearance correction which comprises a load appearance correcting unit for correcting the appearance of the individual load stages one at a time, a load kind discriminator for discriminating the kind of each stage load, and a warehousing process controller for permitting, if the loads in the individual load stages are of the same kind, the individual load stages to be warehoused in the form of the stack, and permitting, if the loads in the individual load stages are of different kinds, warehousing of the loads after disassembling the stack into loads of the different kinds.

Further, according to the present invention, in the automatic warehouse equipment, which further comprises a load appearance height sensor for detecting the height of the load appearance in each stage, the warehousing process controller being capable of recognizing the kinds and quantities of loads to be warehoused according to the outputs of the load kind discriminator and the load appearance height sensor.

With the above constructions, the following functions are obtainable.

① A plurality of vertically stacked loads can be appearance corrected at the same time. Thus, there is no necessity of disassembling the stacked loads into individual pallet loads in front of the load appearance connector. Satisfactory warehousing efficiency thus can be obtained.

② A stack of loads, in which the loads in the individual stages are of the same kind, is warehoused in the form of the stack after the appearance correction. Thus, disassembling or re-assembling of the stack is not involved. Satisfactory warehousing efficiency thus can be obtained.

③ The kinds and quantities of loads to be warehoused can be readily recognized according to the outputs of the load kind discriminator and the load appearance height sensor.

(C) According to the present invention, in the method of load appearance correction for accommodating a load on a load setting area to be within the width thereof by pushing the load with a pair of opposed load appearance correction plates, the pair load appearance correction plates execute at least two stages of pushing operation such as to push the load to a position within the edges of the load setting area in the first stage of the pushing operation and aligning the load by clamping and pushing the load in the second stage of the pushing operation.

Further, according to the present invention, the apparatus for load appearance correction for accommodating a load on a load setting area to be within the width thereof by pushing the load with a pair of opposed load appearance correction plates, further comprises first pushing means for pushing the load appearance correction plates from an original position to a first pushing position coincident with the edges of the load setting area, and second pushing means for pushing the load appearance correction plates from the first pushing position to a second pushing position, at which the load is clamped and appearance corrected.

With the above constructions, the following functions are obtainable.

The load appearance correction plates are capable of a two-stage pushing operation. Thus, if stacked loads are deviated beyond a load setting area (for instance a pallet) as shown in FIG. 21(A), and if the load appearance correction plate on the side of the loads that extend beyond the load setting area first strikes the loads and is moved slowly due to a resistance offered by the loads, the two load appearance correction plates do not complete the clamping of the loads during their first stage pushing operation. At the completion of the first stage pushing operation, the two load appearance correction plates reach a first pushing position corresponding to the edges of the load setting area (see FIG. 21(B)).

Then, in the second stage pushing operation, the two load appearance correction plates complete the clamping of the loads such that the loads are within the width of the load setting area (see FIG. 21(C)). That is, the appearance corrected loads are accommodated with the opposite side within the width of the load setting area (FIG. 12(D)).

That is, the two load appearance correction plates bring the loads to be within the edges of the load setting area in their first stage pushing operation and complete the clamping of the loads to effect the appearance correction thereof in their second stage pushing operation.

(D) According to the present invention, the apparatus for load appearance correction further comprises a pair of opposed lifting levers capable of being raised and lowered in a state inserted in opposite end portions of a through hole formed in a pallet, an upper and a lower light-emitting element provided on the upper and lower surfaces, respectively, of one of the lifting levers, and an upper and a lower light-receiving element provided on the upper and lower surfaces, respectively, of the other one of the lifting levers, the two lifting levers provided on the opposite sides of the pallet being capable of adjustment of the vertical level, the turning-on of both the upper and lower light-receiving elements being used as a condition of determination that the lifting levers are at a position capable of inserting into the through holes.

With the above constructions, the following functions are obtainable.

The opposed lifting levers in the pair, initially, are provisionally set to the level of the through hole in the pallet as determined by data of the pallet load appearance or the like. In this state, it is checked whether light emitted from the upper and lower light-emitting elements on the upper and lower surfaces of one of the lifting levers can be received by the upper and lower light-receiving elements provided on the upper and lower surfaces of the other lifting lever. If both the upper and lower light-receiving elements are "on", it is obvious that the upper and lower surfaces of the lifting levers can be accommodated in the through holes. Thus, the lifting levers can be reliably inserted in the through hole in the pallet for being raised or lowered.

BRIEF DESCRIPTION OF THE DRAWINGS

FIGS. 6 (A) and (B) are schematic views showing a load appearance height sensor;

FIG. 7 is a schematic view showing the rules of the load appearance height detection;

FIG. 9 is a table showing items of load appearance correction determined by load appearance;

FIG. 11 is a flow chart showing the procedure of a warehousing quantity calculation process;

FIGS. 12 (A) to (E) are schematic views for explaining a two-stage stack pallet load appearance correcting operation;

FIG. 17 is a schematic view showing a further different load appearance correcting unit;

FIG. 18 is a schematic view showing a modification of a pusher in the load appearance correcting unit;

FIG. 19 is a schematic view showing a further modification of a pusher in the load appearance correcting unit;

BEST MODES OF IMPLEMENTING THE INVENTION

Figure 1:
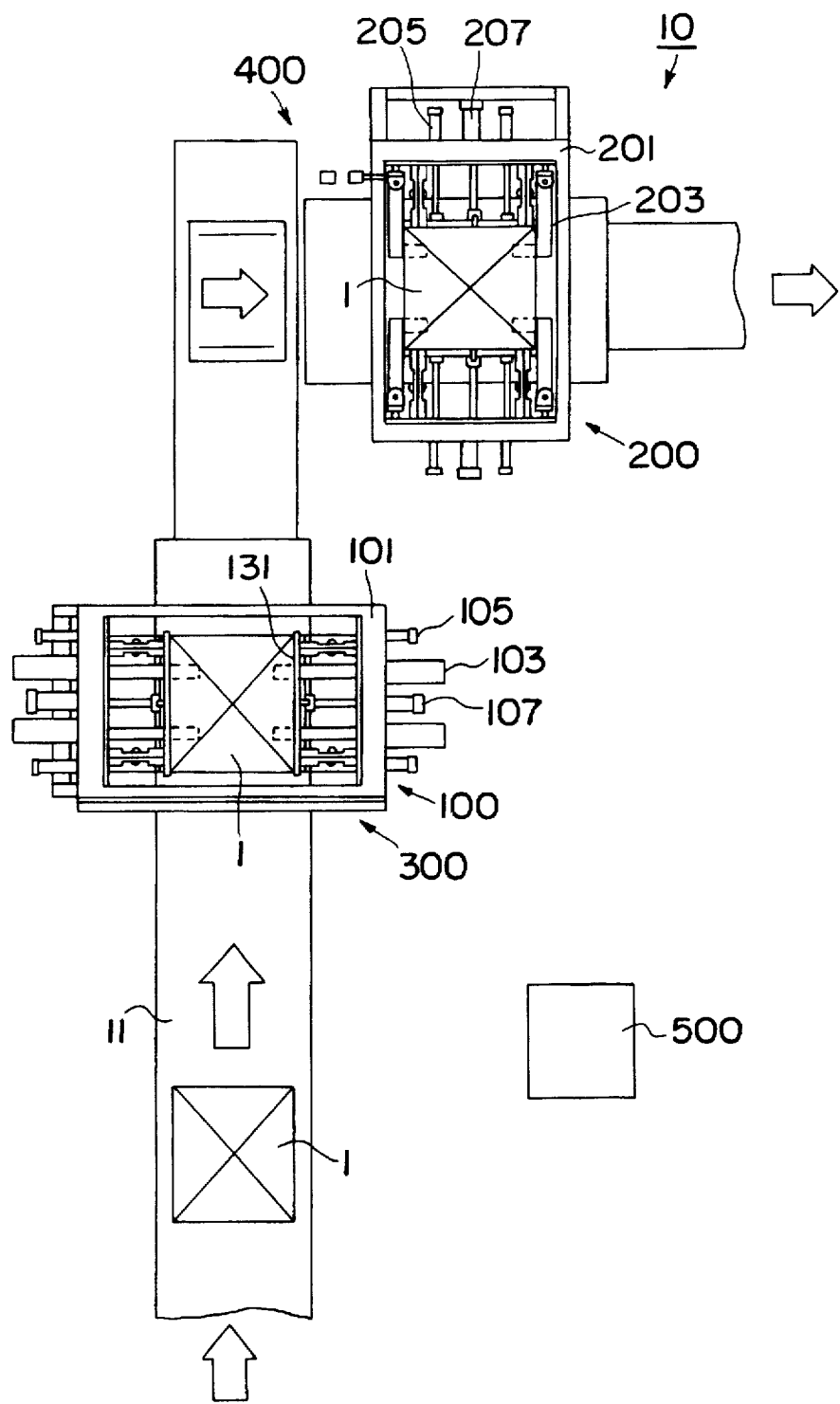
FIG. 1 is a plan view showing equipment for warehousing loads into an automatic warehouse.

FIG. 1 shows equipment 10 for warehousing loads into an automatic warehouse. The equipment if has a conveyor 11, which conveys pallet loads (i.e., loads 3 placed on respective pallets 2) having been fed in from a truck to the warehouse. An X- and a Y-direction load appearance correcting unit 100 and 200 are provided on the path of the conveyor 11 at different positions thereof. A load appearance height sensor 300 is provided on the inlet side of the X-direction load appearance correcting unit 100. A load kind discriminator 400 is provided on the inlet side of the Y-direction load appearance correcting unit 200. The warehousing equipment further has a warehousing process controller 500. The individual components of the warehousing equipment 10 will now be described in detail. The direction of fork insertion into fork insertion holes (through holes) in pallet 2 is referred to as the X-direction, and the direction perpendicular to the X-direction is referred to as the Y-direction.

Figure 2A:
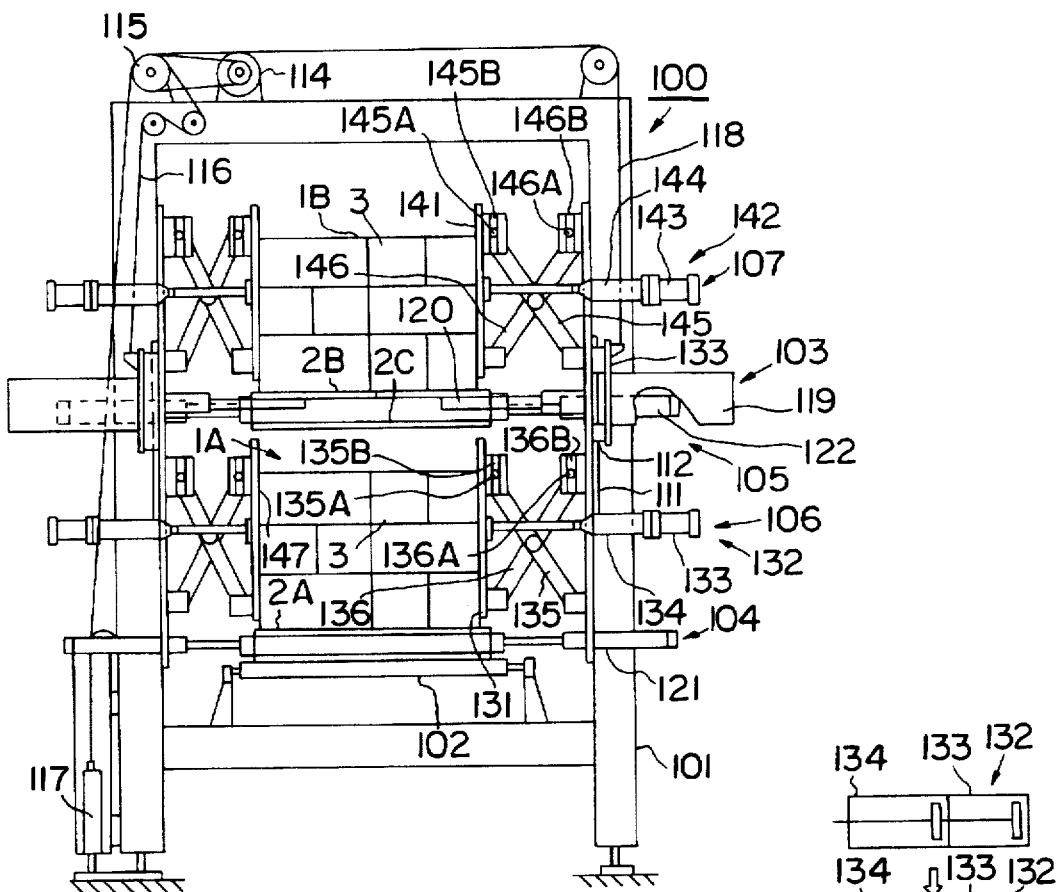
FIGS. 2 (A) to (C) are schematic views showing an X-direction load appearance correcting unit.
Figure 2C:
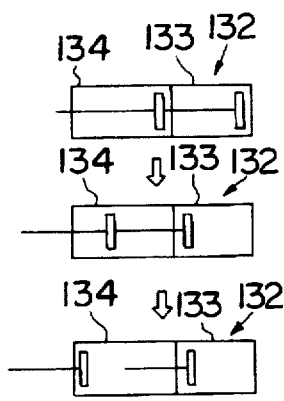
Figure 2B:
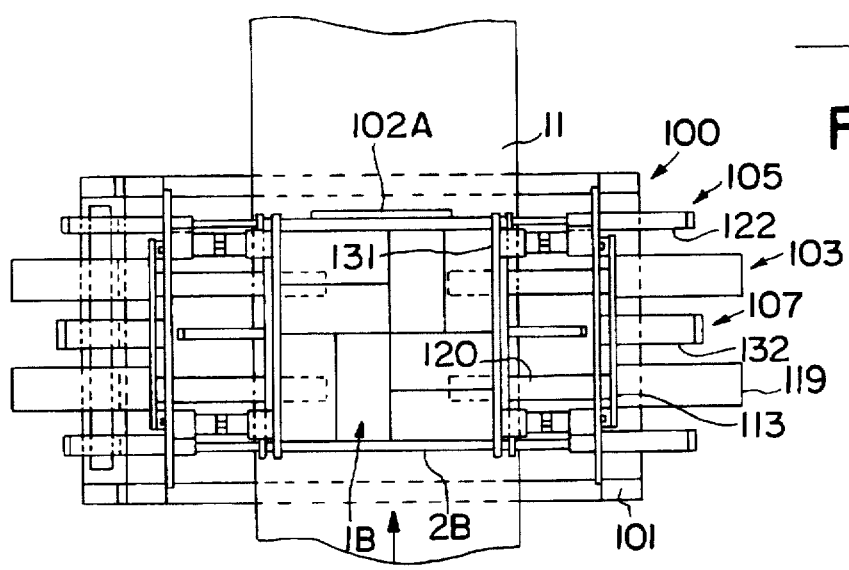

(A) X-direction load appearance correcting unit 100 (see FIG. 2)

The X-direction load appearance correcting unit 100 has a frame 101, which carries a feed roller 102 continuous to a conveyor 11. Pallet loads 1 proceed past the feed roller 102, and during this time they can be appearance corrected in the X-direction. The X-direction load appearance correcting unit 100 can correct the appearance of a plurality of vertically stacked pallet loads 1 (see FIG. 12) at a time, and also it can correct the appearance of a single pallet load (see FIGS. 14 and 15). On the outlet side of the feed roller 102, a pallet stopper 102A is provided such that it can be advanced and retreated vertically with respect to the roller surface. Thus, it can set the pallet load 1 in a load appearance correction area.

The X-direction load appearance correcting unit 100 comprises an upper stage pallet lift 103, a lower stage pallet securing unit 104, an upper stage pallet securing unit 105, a lower stage load appearance correcting unit 106 and an upper stage load appearance correcting unit 107.

The upper stage pallet lift 103 raises and lowers an upper stage pallet 2B between a stacked position on the lower stage pallet load 1A and a load appearance correction position spaced apart upward from the lower stage pallet load 1A.

Specifically, in the upper stage lift 103, vertical guide rails 111 are secured to opposite side leg portions of the frame 101 such that they face each other in the X-direction. Lift members 113 are coupled to the guide rails 111 via linear guides 112 such that they can be raised and lowered. Atop the frame 101, a drive sprocket 115 is provided such that it is driven by a motor 114. A chain 116 which is coupled to the left side lift member 113 is passed around the drive sprocket 115. A counterweight 117 is coupled to the end of the chain 116. Another chain 118 which is coupled to the right side lift member 113 is also passed around the drive sprocket 115, and to its end the counterweight 117 is also coupled. Thus, the opposite side lift members 113 can be raised and lowered as they are driven by the motor 114. The opposite side lift members 113 have lifting lever operation cylinders 119 with piston rods, which lifting levers 120 are integral. The lifting levers 120 are capable of being engaged in and disengaged from opposite end portions of a through hole 2C (fork insertion hole) which penetrates the upper stage pallet 2B in the X-direction.

Specifically, the upper stage pallet lift 103 can separate the upper stage pallet 2B from the lower stage pallet load 1A by raising the lift members 113 and lifting levers 120 with the lifting levers 120 inserted in the through hole 2C of the upper stage pallet 2B and thus hold the upper stage pallet 2B at the load appearance correction position.

The lifting levers 120 are aligned to the through hole 2C of the upper stage pallet 2B and then inserted in the hole 2C as follows. First, the lifting levers 120 are provisionally set to the level of the through hole 2C according to information from the load appearance height sensor 300 which will be described later in detail. The lifting levers 120 are completely made coincident with the through hole 2C according to information from lifting lever setter 151. Then the lifting levers 120 are inserted.

The lower stage pallet securing unit 104 is disposed in correspondence to the load appearance correction position of the lower stage pallet load 1A and serves to secure the lower stage pallet 2A in position. Specifically, the lower stage pallet securing unit 104 has a pair of opposite side lower stage pallet securing cylinders 121, which are provided on the opposite side leg portions of the frame 101 facing each other in the X- direction. The cylinders 121 serve to secure the lower stage pallet 2A on the feed roller 102 in position.

The upper pallet securing unit 105 is disposed in correspondence to the load appearance correction position of the upper stage pallet load 1B and serves to secure the upper stage pallet 2B in position. Specifically, the upper stage pallet securing unit 105 has a pair of opposite side upper stage pallet securing cylinders 122, which are provided on the opposite side leg portions of the frame 101 facing each other in the X-direction. The cylinders 122 serve to secure the upper stage pallet 2B on the lifting levers 120 in position.

The lower stage load appearance correcting unit 106 is disposed in correspondence to the load appearance correction position of the lower stage pallet load 1A and serves to correct the appearance of the lower stage pallet load 1A. Specifically, the lower stage load appearance correcting unit 106 pushes the load 3 on the lower stage pallet 2A in the X-direction with the opposite side load appearance correction plates 131 facing each other in the X-direction to effect appearance correction of the lower stage pallet load 1A in the X-direction. The load 3 thus is accommodated within the width of the lower stage pallet 2A.

Specifically, the lower stage load appearance correcting unit 106 has a pair of opposite side pushers 132 which are provided on the opposite side leg portions of the fame 101 facing each other in the X-direction. Each pusher 132 comprises a two-stage stroke air cylinder, which includes a first pushing cylinder 133 and a second pushing cylinder 134 connected in series with an end of the first pushing cylinder 133. A load appearance correction plate 131 is connected to the other end of the second pushing cylinder 134. The load appearance correction plate 131 is supported on the frame 101 via two links 135 and 136 coupled together in a form of letter X, and it can undergo parallel movement. The links 135 and 136 have respective upper end cam followers 135A and 136A, which are guided by vertical guide rails 135B and 136B provided on the load appearance correction plate 131 and frame 101, respectively. The pushers 132, as shown in FIG. 2(C), each effect a first stage pushing operation with air supply to the first pushing cylinder 133 and effect a second stage pushing operation with air supply to the second pushing cylinder 134.

More specifically, in the lower stage load appearance correcting unit 106, the first stage pushing operation by the first pushing cylinders 133 has an effect of pushing the load appearance correction plates 131 from the original position to the first pushing position coincident with the edges of the lower stage pallet 2A. The load 3 thus is pushed to be within the edges of the lower stage pallet 2A. The subsequent second stage pushing operation by the second pushing cylinders 134 has an effect of pushing the load appearance correction plates 131 to clamp and push the load 3 from the first pushing position to a second pushing position to correct the appearance of the lower stage pallet load 1A. Thus, the load 3 on the lower stage pallet 2A is appearance corrected to be reliably accommodated within the width of the lower stage pallet 2A in the X-direction.

The upper stage load appearance correcting unit 107 is disposed in correspondence to the upper stage pallet load 1B, which has been separated from the stacking position on the lower stage pallet load 1A and held at the upper load appearance correction position by the upper stage pallet lift 103, and it serves to correct the appearance of the upper stage pallet load 1B. Specifically, the upper stage load appearance correcting unit 107 pushes the load 3 on the upper stage pallet 2B in the X-direction a pair of load appearance correction plates 141 facing each other in the X-direction. Thus, the upper stage pallet load 1B is accommodated within the width of the upper stage pallet 2B in the X-direction.

Specifically, the upper stage load appearance correcting unit 107 has a pair of opposite side pushers 142, which are provided on the opposite side leg portions of the frame 101 facing each other in the X-direction. The pushers 142 each comprise a two-stage stroke air cylinder, which includes a first pushing cylinder 143 and a second pushing cylinder 144 connected in series with the end of the first pushing cylinder 143. A load appearance correction plate 141 is coupled to the other end of the second pushing cylinder 144. Each load appearance correction plate 141 is supported on the frame 101 via two links 145 and 146 coupled together in the form of an X, and it can undergo parallel movement. The links 145 and 146 have respective upper end cam followers 145A and 146A, which can be guided by vertical guide rails 145B and 146B provided on the load appearance correction plate 141 and frame 101, respectively. The pushers 142 perform a first stage pushing operation with air supply to first pushing air cylinders 143 and a second stage pushing operation with air supply to second pushing cylinders 144.

In the upper stage load appearance correcting unit 107, the first stage pushing operation of the first pushing cylinders 143 has an effect of pushing the load appearance correction plates 141 from the original position to a first pushing position coincident with the edges of the upper stage pallet 2B. The load 3 thus is pushed to be within the edges of the upper stage pallet 2B. The subsequent second stage pushing operation of the second pushing cylinders 144 has the effect of pushing the load appearance correction plates 141 to clamp and push the load 3 from the first pushing position to a second pushing position to correct the appearance of the upper stage pallet load 1B. Thus, the load 3 on the upper stage pallet 2B is appearance corrected to be reliably accommodated within the width of the upper stage pallet 2B in the X-direction.

In the X-direction load appearance correcting unit 100, each load appearance correction plate 131 of the lower stage load appearance correcting unit 106 has a slit 147 formed adjacent the upper edge such that each lifting lever 120 of the upper stage pallet lift 103 can vertically pass through the slit 147. Thus, the lifting lever 120 can be engaged with and disengaged from the corresponding upper stage pallet 2B on the lower stage pallet load 1A in an engaging/disengaging path for avoiding the interference with the lower state load appearance correcting unit 106.

Figure 4:
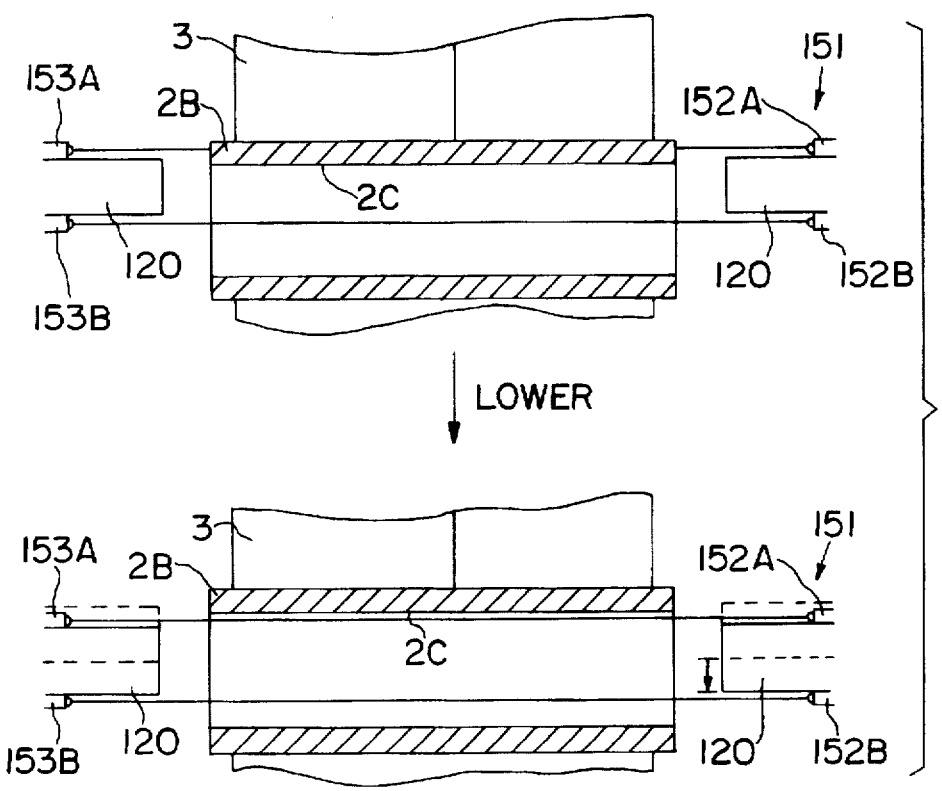
FIG. 4 is a schematic view for explaining an operation of setting lifting levers of a pallet lift.
Figure 5:
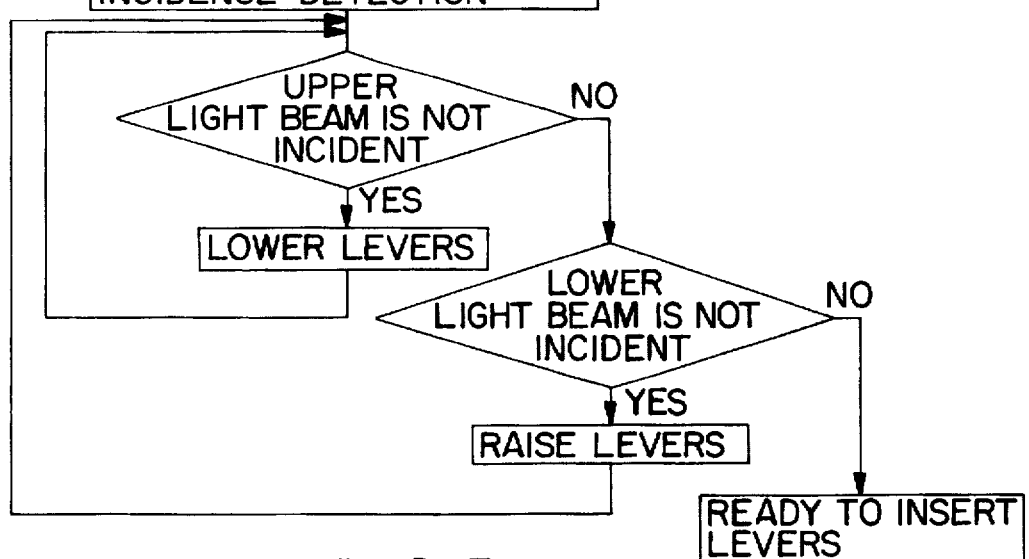
FIG. 5 is a flow chart of the operation of setting the lifting levers of the pallet lift.

The X-direction load appearance correcting unit 100 has the lifting lever setting unit 151 to be described later in detail for inserting the lifting levers 120 of the upper stage pallet lift 103 in the through hole 2C in the upper stage pallet 2B. As shown in FIGS. 4 and 5, the lifting lever setting unit 151 has an upper and a lower light-emitting element 152A and 152B, which are provided on the respective upper and lower surfaces one of the lifting levers 120, and an upper and a lower light-receiving element 153A and 153B which are provided on the respective upper and lower surfaces of the other lifting lever 120. The light-emitting and light-receiving elements 152A and 153A have a common light axis, while the light-emitting and light-receiving elements 152B and 153B have a common light axis. The warehousing process controller 500 is supplied with light reception signals from the light-receiving elements 153A and 153B in state with the lifting levers 120 provisionally set to the level of the through hole 2C according to detection information from the load appearance height sensor 300 which will be described later in detail. When both the upper and lower light-receiving elements 153A and 153B are turned on (i.e., receive light), the controller 500 recognizes that the lifting levers 120 are perfectly coincident with the through hole 2C and uses this as a condition for determination that the lifting levers 120 are ready for insertion into the through hole 2C. More specifically, if the upper light-receiving element 153A is not receiving light, the warehousing process controller 500 lowers and adjusts the lifting levers 120 with the motor 114 (see FIGS. 4 and 5). If the lower light-receiving element 153B is not receiving light, the controller 500 raises and adjusts the lifting levers 120 with the motor 114. When both the light-receiving elements 153A and 153B are receiving light, the vertical movement of the lifting levers 120 is stopped, and insertion of the lifting levers 120 with the lifting lever operation cylinders 119 is started.

Figure 3A:
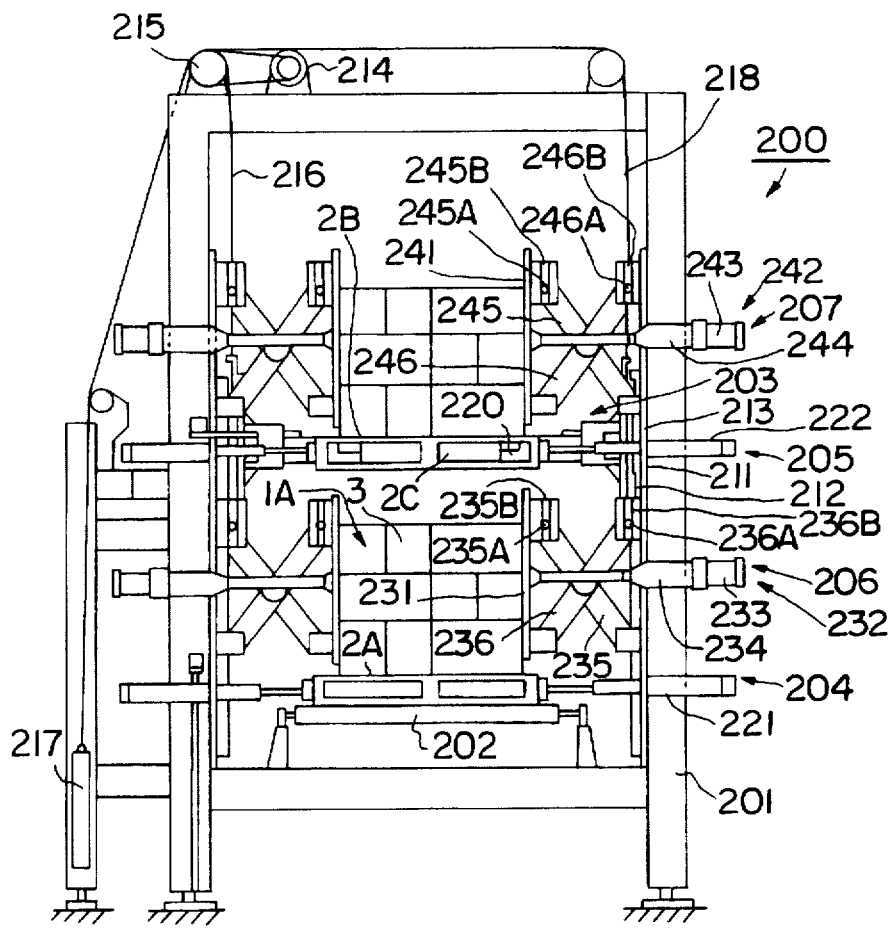
FIGS. 3 (A) and (B) are schematic views showing a Y-direction load appearance correcting unit.
Figure 3B:
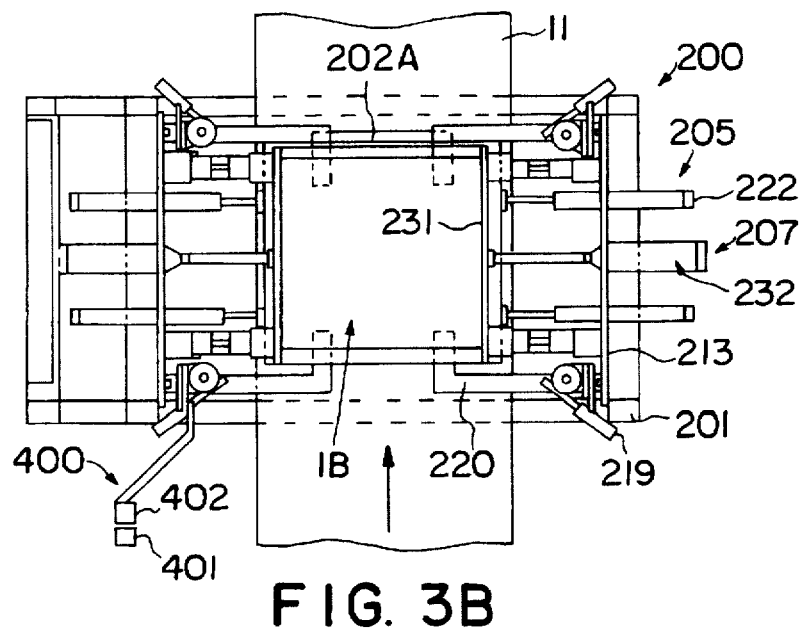

(B) Y-direction load appearance correcting unit 200 (see FIG. 3)

The Y-direction load appearance correcting unit 200 is disposed downstream the X-direction load appearance correcting unit 100, and it has a frame 201 carrying a feed roller 202 continuous to the conveyor 11. The pallet loads 1, which have been appearance corrected in the X-direction by the X-direction load appearance correcting unit 100, proceed past the feed roller 202. During this time, the pallet loads 1 can be appearance corrected in the Y-direction. The Y-direction load appearance collecting unit 200 can appearance correct a plurality of vertically stacked pallet loads (see FIG. 12) at a time, and also it can appearance correct a single pallet load (see FIGS. 14 and 15). In the Y-direction load appearance correcting unit 200 has a pallet stopper 202A provided on the outlet side of the feed roller 202 such as to be vertically advanced and retreated with respect to the roller surface for setting the pallet load 1 in a load setting area.

The Y-direction load appearance correcting unit 200 has an upper stage pallet lift 203, a lower stage pallet securing unit 204, an upper stage pallet securing unit 205, a lower stage load appearance correcting unit 206, and an upper stage load appearance correcting unit 207.

The upper stage pallet lift 203 can raise and lower an upper stage pallet 2B between a stacked position on the lower pallet load 1A and a load appearance correction position spaced upward from the lower pallet load 1A.

Specifically, in the upper stage pallet lift 203, vertical guide rails 211 are secured to opposite side leg portions of the frame 201 that face each other in the Y-direction, and lift members 213 are coupled for raising and lowering along the guide rails 211 via linear guides 212. A drive sprocket 215 is driven atop the frame 201 for being driven by a Motor 214. A chain 216 which is coupled to the left side lift member 213, is passed around the drive sprocket 215, and to its end is coupled a counterweight 217. Also, a chain 218 which is coupled to the right side lift member 213 is passed around the drive sprocket 215, with its end coupled to the counterweight 217. Thus, the opposite side lift members 213 can be raised and lowered as they are driven by the motor 214. The lift members 213 have lifting lever operation cylinders 219. Opposite side lifting levers 220 are pin coupled to piston rods of the lifting lever operation cylinders 219. The lifting levers 220 can be engaged in and disengaged from opposite end portions of the through hole 2C (i.e., fork insertion hole) penetrating the upper stage pallet 2B in the X-direction sidewise of the passage area of the pallet load 1 on the conveyor 11.

The upper stage pallet lift 203 can raise the lift members 213 and levers 220 to separate the upper stage pallet 2B upward from the lower stage pallet load 1A with the opposite lifting levers 220 held inserted in the through hole 2C of the upper stage pallet 2B at the stacked position on the lower stage pallet load 1A. The lower stage pallet 2B thus can be held at the load appearance correction position.

The opposite side lifting levers 220 are brought into coincidence with and inserted into the through hole 2C of the upper stage pallet 2B according to position data, which is obtainable when the lifting levers 120 are brought into coincidence with the through hole 2C according to detection information of the lifting lever setting unit 151 in the X-direction load appearance correcting unit 100. With the load appearances d and f to be described later, however, the lifting levers 120 of the X-direction load appearance correcting unit 100 can not be inserted into the through hole 2C of the upper stage pallet 2B, that is, the detection information of the lifting lever setting unit 151 provided on the lifting levers 120 can not be obtained. Therefore, with the load appearances d and f, the opposite side lifting levers 220 are brought into coincidence with the through hole 2C of the upper stage pallet 2B according to detection information of the load appearance height sensor 300.

In this embodiment of the invention, in the Y-direction load appearance correcting unit 200 as well a lifting lever setting unit 251 like the lifting lever setting unit 151 in the X-direction load appearance correcting unit 100 may be provided to the lifting levers 220 to let the lifting levers 220 be brought into coincidence with and inserted into the through hole 2C of the upper stage pallet 2B according to detection information of the lifting lever setting unit 251.

The lower stage pallet securing unit 204 is disposed in correspondence to the load appearance correction position of the lower pallet load 1A and serves to secure the lower stage pallet 2A. Specifically, in the lower stage pallet securing unit 204, a pair of opposite side lower stage pallet securing cylinders 221 are provided on the opposite side leg portions of the frame 201 that face each other in the Y-direction. The two cylinders 221 serve to secure the lower stage pallet 2A in position.

The upper stage pallet securing unit 205 is disposed in correspondence to the load appearance collection position of the upper stage pallet load 1B, and it serves to secure the upper stage pallet 2B in position. Specifically, in the upper stage pallet securing unit 205, a pair of upper stage pallet securing cylinders 222 are provided on the opposite side leg portions of the frame 201 that face each other in the Y-direction. The two cylinders 222 secure the upper stage pallet 2B on the lifting levers 220 in position.

The lower stage load appearance correcting unit 206 is disposed in correspondence to the load appearance correction position of the lower stage pallet load 1A, and it serves to correct the appearance of the lower stage pallet load 1A. Specifically, in the lower stage load appearance correcting unit 206, the load 3 on the lower stage pallet 2A is pushed in the Y-direction with a pair of opposite side load appearance correction plates 231 that face each other in the Y-direction. The lower stage pallet load 1A is thus appearance corrected in the Y-direction to be accommodated within the width of the lower stage pallet 2A.

Specifically, the lower stage load appearance correcting unit 206 has a pair of opposite side pushers 232, which are provided on the opposite side leg portions of the frame 201 facing each other in the Y-direction. The pushers 232 each comprise a two-stage stroke air cylinder, which includes a first pushing cylinder 233 and a second pushing cylinder 234 connected in series with an end of the first pushing cylinder 233. A load appearance correction plate 231 is coupled to the other end of the second pushing cylinder 234. The load appearance correction plate 231 is supported on the frame 201 via two links 235 and 236 coupled together in the form of an X, and it can undergo parallel movement. The links 235 and 236 have respective upper end cam followers 235A and 236A, which can be guided along vertical guide rails 235B and 236B provided on the load appearance correction plate 231 and frame 201, respectively. The pushers 232, like those shown in FIG. 2(C), perform a first stage pushing operation with air supply to the first pushing cylinders 233 and a subsequent second stage pushing operation with air supply to the second pushing cylinders 234.

More specifically, in the lower stage load appearance correcting unit 206, the first stage pushing operation by the first pushing cylinders 233 has an effect of pushing the load appearance correction plates 231 from the original position to a first pushing position to let the load 3 be aligned to the edges of the lower stage pallet 2A. The subsequent second stage pushing operation by the second pushing cylinders 234 has an effect of pushing the load appearance correction plates 231 from the first pushing position noted above to a second pushing position, at which the load 3 is clamped to appearance correct the lower stage pallet load 1A. Thus, the load 3 on the lower stage pallet 2A can be appearance corrected in the Y-direction to be reliably accommodated in the width of the lower stage pallet 2A.

The upper stage load appearance correcting unit 207 is disposed in correspondence to the upper stage pallet load 1B, which has been separated upward from the stacked position on the lower stage pallet load 1A and held at an upper load appearance correction position by the upper stage pallet lift 203 noted above, and it serves to correct the appearance of the upper pallet load 1B. Specifically, the upper stage load appearance correcting unit 207 pushes the load 3 on the upper stage pallet 2B in the Y-direction with a pair of opposed load appearance correction plates 241. The upper stage pallet load 1B thus is appearance corrected in the Y-direction to be accommodated within the width of the upper stage pallet 2B.

Specifically, the upper stage load appearance correcting unit 207 has a pair of opposite side pushers 242, which are provided on the opposite side leg portions of the frame 201 that face each other in the Y-direction. The pushers 242 each comprise a two-state stroke air cylinder, which includes a first pushing cylinder 243 and a second pushing cylinder 144 connected in series with an end of the first pushing cylinder 243. A load appearance correction plate 241 is coupled to the other end of the second pushing cylinder 244. The load appearance correction plate 241 is supported on the frame 201 via two links 245 and 246 coupled together in the form of an X, and it can undergo parallel movement. The links 245 and 246 have respective upper end cam followers 245A and 246A, which can be guided along guide rails 245B and 246B provided on the load appearance collection plate 241 and frame 201, respectively. The pushers 242 perform a first stage pushing operation with air supplied to the first pushing cylinders 243 and a subsequent second stage pushing operation with air supply to the second pushing cylinders 244.

Specifically, in the upper stage load appearance correcting unit 207, the first stage pushing operation by the first pushing cylinders 243 has an effect of pushing the load appearance correction plates 241 from the original position to a first pushing position to let the load 3 be aligned to the edges of the upper stage pallet 2B. The subsequent second pushing operation by the second pushing cylinders 244 has an effect of pushing the load appearance correction plates 241 from the first pushing position noted above to a second pushing position, at which the load 3 is clamped to appearance correct the upper stage pallet load 1B. The load 3 on the upper stage pallet 2B thus can be appearance corrected in the Y-direction to be reliably accommodated within the width of the upper stage pallet 2B.

It is a great difference of the Y-direction load appearance correcting unit 200 from the X-direction load appearance correcting unit 100 that the lifting levers 220 of the upper stage pallet lift 203 can be engaged in and disengaged from the through hole 2C that penetrates the upper stage pallet 2B in the X-direction from a side of an area passed by the pallet load 1 on the conveyor 11. The upper stage pallet 2B thus can be engaged with and disengaged from the upper stage pallet 2B that is held on the lower stage pallet load 1A in an engagement/disengagement path which permits interference with the lower stage load appearance correcting unit 206 to be perectly avoided. Thus, with the Y-direction load appearance correcting unit 200, it is possible ① to cause the lifting levers 220 to be engaged in and disengaged from the same X-direction through hole 2C of the upper stage pallet 2B as that which the lifting levers 120 of the X-direction load appearance correcting unit 100 has been engaged in and disengaged from, thus permitting use of a two sides insertion pallet (with only through hole 2C penetrating in the X-direction), and ② to permit, after paying out only the lower stage pallet load 1A to the conveyor 11 with tentative driving of the feed roller 202 subsequent to the appearance correction of the pallet loads 1A and 1B, the lifting levers 220 of the upper stage pallet lift 203 to be lowered toward the feed roller 202 without interference with the lower stage load correcting unit 206 for paying out the upper stage pallet load 1B in a disassembled stage as a single pallet load to the conveyor 11.

The Y-direction load correcting unit 200, like the X-direction load appearance correcting unit 100, may have the lifting lever setting unit 251 to permit insertion of the lifting levers 220 of the upper stage pallet lift 203 in the through hole 2C in the upper stage pallet 2B. The lifting lever setting unit 251 is the same in structure as the lifting lever setting unit 151, having an upper and a lower light-emitting element on the respective upper and lower surfaces of one of the lifting levers 220 and an upper and a lower light-receiving element provided on the respective upper and lower surfaces of the other lifting lever 200, the turning-on of both the upper and lower light-receiving elements being used as a condition of determination that the lifting levers 220 are at the position ready for insertion into the through hole 2C.

(C) Load appearance height sensor 300 (see FIGS. 6 and 7)

The load appearance height sensor 300 can detect the height of the load appearance of the pallet loads 1 (1A and 1B).

Specifically, the load appearance height sensor 300 is disposed on the inlet side of the X-direction load appearance correcting unit 100 and has a large number of pairs each of a light-emitting and a light-receiving element 302 and 303. The light-emitting and light-receiving elements 302 and 303 are provided respectively on opposite leg portions of a gate-like frame 301 striding a position of passage of the pallet load 1 on the conveyor 11 such that they are spaced apart at a constant interval (i.e., detection pitch P) in the height direction.

The warehousing equipment 10 has a light-emitting and a light-receiving element 305 and 306, which are provided as a pair near the frame 301 and on the opposite sides of a position of passage of the lower stage pallet 2A on the conveyor 11 and form a pallet passage sensor 304.

The warehousing process controller 500 detects the passage of the lower stage pallet 2A from an "off" signal provided from the light-receiving element 306 of the pallet passage sensor 304, and calculates appearance height information of the pallet load 1 using rules ① to ⑤ below according to the result of detection by the load appearance height sensor 300 at the time of the pallet passage detection.

① Total height $h_1$ of appearance of pallet load 1.

This value is calculated by using an equation $$h_1 = PHS + P/2 \tag{1}$$

where PHS is the level of the uppermost stage light-blocking light-receiving element 303 with reference to the conveying surface of the conveyor 11.

② Level $h_2$ of through hole 2C in upper stage pallet 2B.

If there are two intermediate light-receiving elements 303, on which light is incident, the center level between these two light-receiving elements 303 is referred to as $h_2$.

If there are three light-receiving elements 303, on which light is incident, the level of the central one of these three light-receiving elements 303 is referred to as $h_2$.

③ Levels $h_3$ to $h_n$ of through holes in intermediate stage pallets in three or more stacked pallet loads, are like $h_2$.

④ Total height HA of lower stage pallet load 1A.

This value is calculated by using an equation $$HA = h_2 - PL/2 \tag{2}$$

where PL is the thickness of the pallet.

⑤ Total height HB of upper stage pallet load 1B.

This value is calculated by using an equation $$HB = h_1 - HA \tag{3}$$

Figure 8:
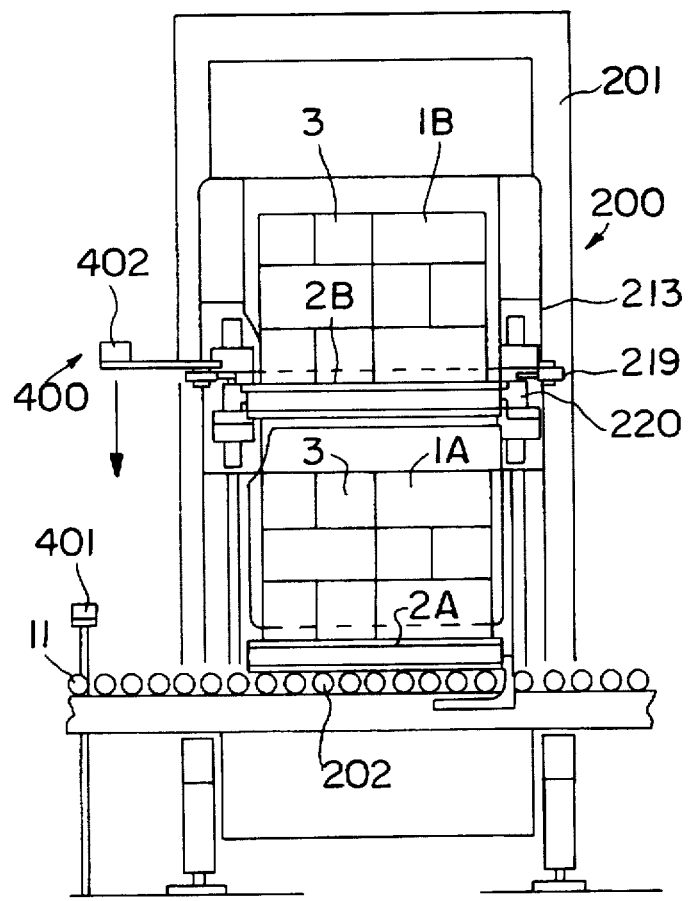
FIG. 8 is a schematic view showing a load kind discriminator.

(D) Load kind discriminator 400 (see FIG. 8)

The load kind discriminator 400 discriminates the kind of the load 3 as the pallet load 1 (1A, 1B).

Specifically, the load kind discriminator 400 includes a lower and an upper stage load kind reader 401 and 402 (i.e., bar code readers) both disposed on the inlet side of the Y-direction load appearance correcting unit 200. The lower stage load kind reader 401 is disposed sidewise of a position of passage of the pallet load 1 on the conveyor 11 and secured in position such as to correspond to the load 3 located at a lower position on the lower stage pallet 2A. It reads out the kind of the load 3 on the lower stage pallet 2A. The lower stage load kind reader 402 is secured in position on the lift members 213 of the upper stage pallet lift 203 of the Y-direction load appearance correcting unit 200, and it reads out the kind of the load 3 on the upper stage pallet 2B. Load kind signals from the upper and lower load kind readers 401 and 402 of the load kind discriminator 400 are transferred to the warehousing process controller 500.

Figure 10:
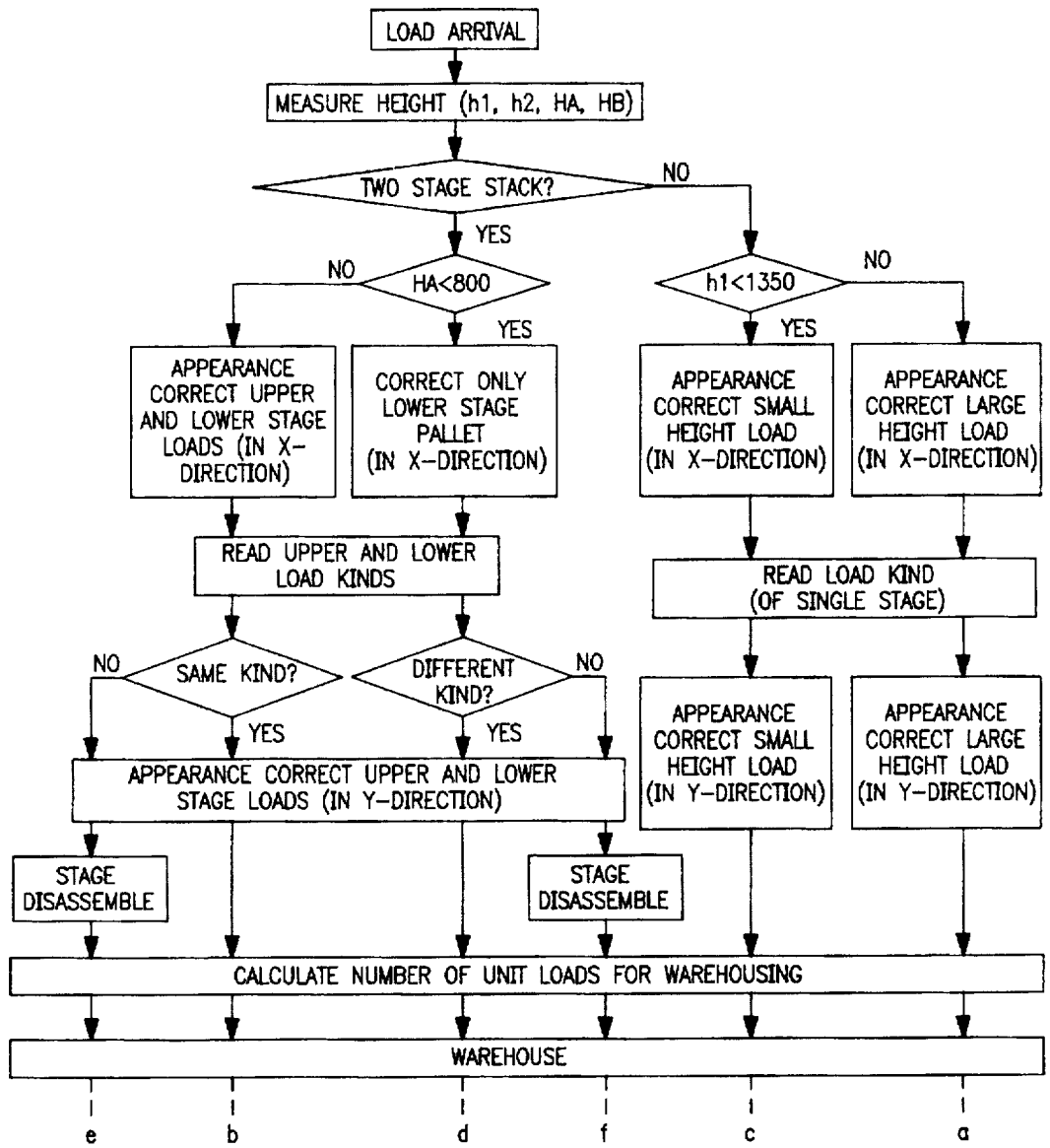
FIG. 10 is a flow chart showing the procedure of a warehousing process.

(E) Warehousing process controller 500 (see FIGS. 9 and 10)

The warehousing process controller 500 determines the appearance of the prevailing pallet load 1, for instance to be a to f as shown in FIG. 9, according to the outputs of the load appearance height sensor 300 and load kind discriminator 400, and controls the X- and Y-direction load appearance correcting units 100 and 200 according to the result of the determination.

① Load appearance a

From load appearance height information ($h_1$, $h_2$, HA, HB) of the load appearance height sensor 300, it is recognized that the pallet load 1 is a single stage load. Since the load height hi is above a predetermined load height, the load is appearance corrected successively in the X- and Y-direction load appearance correcting units 100 and 200 (as will be described later). The load kind is read out by the load kind reader 400 on the inlet side of the Y-direction load appearance correcting unit 200.

After the pallet loads 1 has been subjected to the appearance corrections as noted above, their kind and number of stack are recognized from the outputs of the load kind discriminator 400 and load height appearance sensor 300, respectively, before it is warehoused.

The number of stack of the load is calculated by a method as will be described later.

② Load appearance b

From load appearance height information ($h_1$, $h_2$, HA, HB) from the load appearance height sensor 300, it is recognized that the pallet load 1 is a two-stage stacked load. Then, since HA is above a predetermined height, appearance correction is done on the vertical stages in the X-direction load appearance correcting unit 100. Then, on the inlet side of the Y-direction load appearance correcting unit 200, the kinds of the upper and lower pallet loads 1A and 1B are read out by the load kind discriminator 400, and thus it is recognized that these loads are of the same kind. Then, appearance correction on the vertical stages is done in the Y-direction load appearance correcting unit 200.

After the pallet loads 1 have been subjected to the above vertical stage appearance correction, their kind and number of stack are recognized according to the outputs of the load kind discriminator 400 and the load appearance height sensor 300, respectively. They are then warehoused as a two-stage stack.

③ Load appearance c

From load appearance height information ($h_1$, $h_2$, HA, HB) from the load appearance height sensor 300, it is recognized that the pallet load 1 is a single stage load. Then, since the load height $h_1$ is less than a predetermined height, the load is subjected to successive small height load appearance corrections (to be described later) in the X- and Y-direction load appearance correcting units 100 and 260. On the inlet side of the Y-direction load appearance correcting unit 200 the kind of the load is read out by the load kind discriminator 400.

After the pallet load 1 has been subjected to the above small height load appearance corrections, its kind and number of stack are recognized according to the outputs of the load kind discriminator 400 and the load appearance height sensor 300 before it is warehoused.

④ Load appearance d

From load appearance height information ($h_1$, $h_2$, HA, HB) from the load appearance height sensor 300, it is recognized that the pallet load 1 is a two-stage stack load. Then, since HA is less than a predetermined height, the level of the upper stage pallet 2B on the lower stage pallet 1A is excessively low. Therefore, in the X-direction load appearance correcting unit 100, the lifting levers 120 of the upper stage pallet lift 103 can not be brought into coincidence with and inserted into the through hole 2C in the upper stage pallet 2B without interference with the lower stage load appearance correcting unit 106. Therefore, the upper stage pallet lift 103 can not separate the upper stage pallet 2B upward from the top of the lower stage pallet load 1A, and only the lower stage pallet 2A is appearance corrected in the X-direction load appearance correcting unit 100. Then, on the inlet side of the Y-direction load appearance correcting unit 200, the kinds of the upper and lower stage pallet loads 1A and 1B are recognized by the load kind discriminator 400, thus recognizing that the loads are of the same kind. Then, appearance correction on the vertical stages is done in the Y-direction load appearance correcting unit 200.

After the pallet loads 1 have been subjected to the vertical stage load appearance correction, their kind and number of stack are recognized from the outputs of the load kind discriminator 400 and load appearance height sensor 300, respectively, and they are then warehoused as the two-stage stack of loads.

⑤ Load appearance e

From load appearance height information ($h_1$, $h_2$, HA, HB) of the load appearance height sensor 300, it is recognized that the pallet load 1 is a two-stage stack load. Then, since HA is above a predetermined height, appearance correction on vertical stages is done in the X-direction load appearance correcting unit 100. Then, on the inlet side of the Y-direction load appearance correcting unit 200, the kinds of the upper and lower pallet loads 1A and 1B are read out by the load kind discriminator 400, thus recognizing that the loads are of different kinds. Then, in the Y-direction load appearance correcting unit 200, appearance correction on vertical stages is done, and further the upper and lower stage pallet loads 1B and 1A are disassembled from each other.

After the pallet loads 1 have been subjected to the above vertical stage load appearance corrections, their kind and number of stack are recognized from the outputs of the load kind discriminator 400 and the load appearance height sensor 300, respectively. Then, the lower stage pallet load 1A (of kind A) is warehoused first, and then the upper stage pallet load 1B (of kind B) is warehoused.

⑥ Load appearance f

From load appearance height information ($h_1$, $h_2$, HA, HB) from the load appearance height sensor 300, it is recognized that the pallet load 1 is of a two-stage stack load. Then, since HA is below a predetermined height, the level of the upper stage pallet 2B on the lower stage pallet load 1A is excessively low. Therefore, in the X-direction load appearance correcting unit 100, the lifting levers 120 of the upper stage pallet lift 103 can not be brought into coincidence with and inserted in the through hole 2C of the upper stage pallet 2B without interference with the lower stage load appearance correcting unit 106. For this reason, the upper stage pallet lift 103 can not separate the upper stage pallet 2B upward from the lower stage pallet load 1A, and the X-direction load appearance correcting unit 100 corrects the appearance of only the lower stage pallet 2A. Then, on the inlet side of the Y-direction load appearance correcting unit 200, the kinds of the upper and lower pallet loads 1A and 1B are read out by the load kind discriminator 400, and on the inlet side of the Y-direction load appearance correcting unit 200, the kinds of the upper and lower pallet loads 1A and 1B are read out by the load kind discriminator 400. It is thus recognized that the loads are of different kinds. The Y-direction load appearance correcting unit 200 then makes appearance correction on vertical stage loads and further disassembles the lower and upper stage pallet loads 1A and 1B.

After the pallet loads 1 have been subjected to the vertical stage load appearance correction, their kind and number of stack are recognized according to the outputs of the load kind discriminator 400 and the load appearance height sensor 300, respectively. Then, the lower pallet load 1A (of kind A) is warehoused first, and then the upper stage pallet load 1B (of kind B) is warehoused.

The warehousing process controller 500 calculates the number of stack M of load to be warehoused as noted in ① to ⑥ above with respect to the load appearances a to f according to load appearance height information (HA, HB) of the load appearance height sensor 300, pallet thickness PL and height H of each load 3 (i.e., cardboard box) as follows ① to ⑥ (see FIG. 11).

① Load appearances a and c

From load appearance height information from the load appearance height sensor 300, it is recognized that the pallet load 1 is a single stage load, and M is calculated using an equation.

$$M = (HA - PL)/H \quad (4)$$

② Load appearances b and d

From load appearance height information from the load appearance height sensor 300, it is recognized that the pallet load 1 is a two-stage stack load. Also, the load kind discriminator 400 recognizes that the upper and lower pallet loads 1A and 1B are of the same kind. Then, M is calculated using an equation.

$$M = (HA + HB - 2PL)/H \quad (5)$$

③ Load appearances e and f

From load appearance height information from the load appearance height sensor 300, it is recognized that the pallet load 1 is of a two-stage stack load. Also, the load kind discriminator 400 recognizes that the upper and lower pallet loads 1A and 1B are of different kinds (the load 1A having a height Ha, the load 1B having a height Hb). With the lower stage pallet load 1A is calculated using equation (6) below.

With the upper stage pallet load 1B is calculated using equation (7) below.

$$M = (HA - PL)/Ha \quad (6)$$

$$M = (HB - PL)/Hb \quad (7)$$

When the vertical stage load appearance correction, vertical stage disassembling, large height load appearance correction and small height load appearance correction are done as in ① to ⑥ noted above, the warehousing process controller 500 controls the load appearance correcting units 100 and 200 as follows.

Vertical stage load appearance correction (see FIG. 12)

The X- and Y-direction load appearance correcting units 100 and 200 operate in the same way. Thus, the following description concerns the X-direction load appearance correcting unit 100 only.

(1) The lift members 113 are raised by driving the motor 114 according to information ($h_2$) from the load appearance height sensor 300 to tentatively set the lifting levers 120 of the upper stage pallet lift 103 to the level of the through hole 2C of the upper stage pallet 2B (see FIG. 12(A)).

(2) The pallet load 1 enters the X-direction load appearance correcting unit 100.

(3) The lifting levers 120 are set to a position ready for insertion into the through hole 2C according to information from the lifting lever setting unit 151.

(4) The lifting levers 120 are inserted into the through hole 2C with the lifting lever operation cylinders 119 (see FIG. 12(B)).

(5) The upper stage pallet 2B is separated upward from the top surface of the lower stage pallet load 1A and set to the load appearance correction position by raising the lift members 113 with the motor 114 (see FIG. 12(C)).

(6) The lower stage pallet 2A is secured in position by driving the pallet securing cylinders 121 of the lower stage pallet securing unit 104, and at the same time the upper stage pallet 2B on the lifting levers 120 is secured in position by driving the pallet securing cylinders 121 of the upper stage pallet securing unit 105 (see FIG. 12(D)).

(7) Concurrently with the operation in (6) above, the load appearance correction plates 131 of the lower stage load appearance correcting unit 106 are pushed to a first pushing position with the first pushing cylinders 133. At the same time, the load appearance correction plates 141 of the upper stage load appearance correcting unit 107 are pushed to a first pushing position with the first pushing cylinders 143 (see FIG. 12 (D)). As a result, the loads 3 as the upper and lower pallet loads 1A and 1B are pushed to be within the edges of the upper and lower pallets 2A and 2B.

(8) The load appearance correction plates 131 of the lower stage load appearance correcting unit 106 are pushed to a second pushing position with the second pushing cylinders 134. At the same time, the load appearance correction plates 141 of the upper stage load appearance correcting unit 107 are pushed to a second pushing position with the second pushing cylinders 144. Thus, the loads 3 as the upper and lower pallet loads 1A and 1B are appearance corrected within the width of the upper and lower pallets 2A and 2B (see FIG. 12(E)).

(9) The upper and lower pallet securing units 104 and 105 are restored to the original position, and at the same time, the load appearance correction plates 131 and 141 of the upper and lower load appearance correcting units 106 and 107 are restored to the original position.

(10) The upper stage pallet 21 is moved to be on the top surface of the lower stage pallet load 1A by lowering the lift members 113 with the motor 114.

(11) The lifting levers 120 are taken out from the through hole 2C with the lifting lever operation cylinders 119.

(12) The pallet load 1 is paid out by driving the feed roller 102, thus bringing an end to the load appearance correction.

Upper stage load separating operation (see FIG. 13)

This operation is done only in the Y-direction load appearance correcting unit 200. After the vertical stage load appearance corrections (in (1) to (9) above) in the Y-direction load appearance correcting unit 200, the following operations are performed.

Figure 13A:
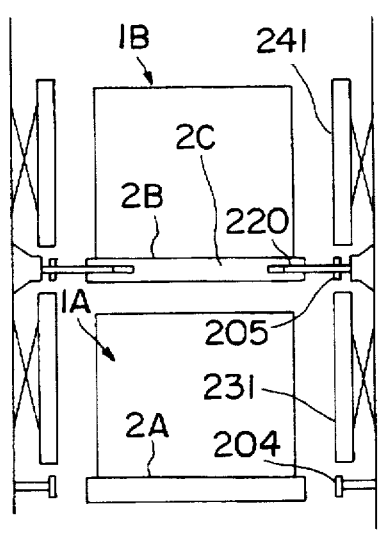
FIGS. 13 (A) and (B) are schematic views showing an operation of disassembling a stack of pallet loads of different kinds.

(1) The lower stage pallet load 1A is advanced in the pay-out direction by driving the feed roller 202 while the upper stage pallet load 1B is held separated at the load appearance correction position above the lower stage pallet load 1A by the upper stage pallet lift 203 (see FIG. 13(A)).

Figure 13B:
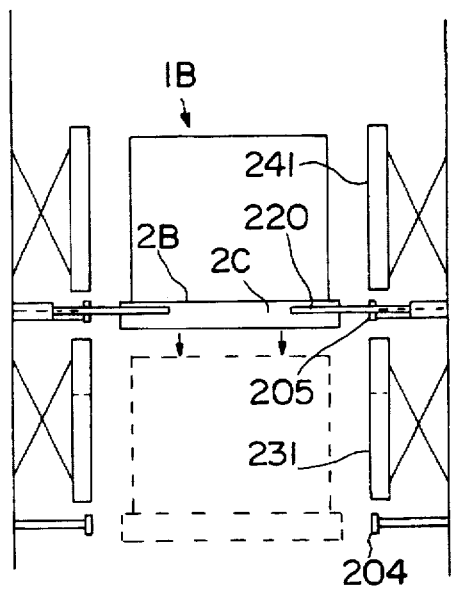

(2) After confirming the pay-out of the lower stage pallet load 1A in (1), the upper stage pallet load 1B is moved to the feed roller 220 by lowering the lifting levers 220 toward the feed roller 202 with the motor 214 of the upper stage pallet lift 203 (see FIG. 13(B)).

(3) The lifting levers 220 are taken out from the through hole 2C of the upper stage pallet 2B with the lifting lever operation cylinders 219.

(4) The upper stage pallet load 1D is paid out by driving the feed roller 202.

Figure 14:
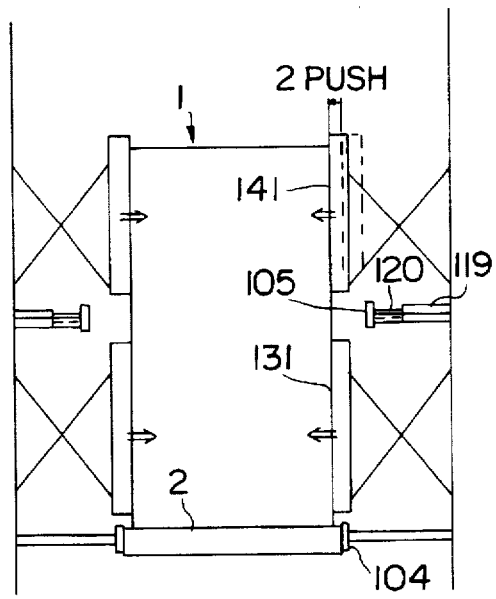
FIG. 14 is a schematic view showing an operation of a highly stacked load appearance correction.

Large height load correction (see FIG. 14)

The X- and Y-direction load appearance correcting units 100 and 200 operate in the same way. Thus, the following operation concerns only the X-direction load appearance correcting unit 100.

(1) The pallet load 1 enters the X-direction load appearance correcting unit 100.

(2) The pallet 2 on the feed roller 102 is secured in position by driving the pallet securing cylinders 121 of the lower stage pallet securing unit 104. At the same time, the load appearance correction plates 131 and 141 of the upper and lower load appearance correcting units 106 and 107 are pushed to a first pushing position with the first pushing cylinders 133 and 143. Thus, the load 3 as the pallet load 1 is pushed to be within the edges of the pallet 2.

(3) The load appearance correction plates 131 and 141 of the upper and lower stage load appearance correcting units 106 and 107 are pushed to a second pushing position with the second pushing cylinders 134 and 144. Thus, the load 3 as the pallet load 1 is appearance corrected within the width of the pallet 2.

(4) The lower stage pallet securing unit 104 is restored to the original position, and at the same time, the load appearance correction plates 131 and 141 of the upper and lower stage load appearance correcting units 106 and 107 are restored to the original position.

(5) The pallet load 1 is paid out by driving the feed roller 102, thus bringing an end to the load appearance correction.

Figure 15:
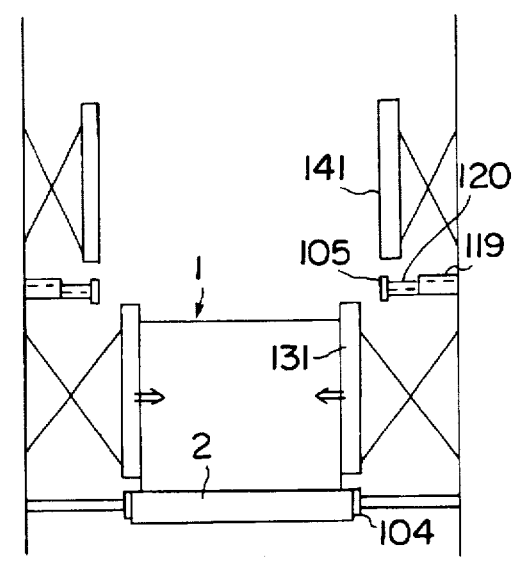
FIG. 15 is a schematic view showing an operation of a low stack load appearance correction.

Small height load appearance correction (See FIG. 15)

The X- and Y-direction load appearance correcting units 100 and 200 operate in the same way. Thus, the following description concerns only the X-direction load appearance correcting unit 100.

(1) The pallet load 1 enters the X-direction load appearance correcting unit 100.

(2) The pallet 2 on the feed roller 102 is secured in position by driving the pallet securing cylinders 121 of the lower stage pallet securing unit 104. At the same time, the load appearance correction plates 131 of the lower stage load appearance correcting unit 106 are pushed to a first pushing position with the first pushing cylinders 133. As a result, the load 3 as the pallet load 1 is pushed to be within the edges of the pallet 2.

(3) The load appearance correction plates 131 of the lower stage load appearance correcting unit 106 are pushed to a second pushing position with the second pushing cylinders 134. As a result, the load 3 as the pallet load 1 is appearance corrected within the width of the pallet 2.

(4) The lower stage pallet securing unit 104 is restored to the original position. At the same time, the load appearance correction plates 131 of the lower stage load appearance correcting unit 106 are restored to the original position.

(5) The pallet load 1 is paid out by driving the feed roller 102, thus bringing an end to the load appearance correction.

Now, the functions of the embodiment will be described.

Since the X- and Y-direction load appearance correcting units 100 and 200 are substantially the same, only the X-direction load appearance correcting unit 100 will be described.

(A) ① In a stage with the upper stage pallet 2B raised and separated from the lower stage load 1A, the loads 1A and 1B are appearance corrected. Thus, since the lower stage load 1A can be moved freely, there is no possibility of causing damage to the load 3 with an irrational force applied thereto.

② The pallet lift 103 raises the upper stage pallet 2B to the load appearance correction position so that the individual stage pallet securing units 104 and 105 and load appearance correcting units 106 and 107 are provided at the respective stage load appearance correction positions. In other words, the individual stage loads 1A and 1B can be appearance corrected by the respective load appearance correcting units 106 and 107 without obstruction of the correcting operation of the load appearance correcting units 106 and 107 by the upper stage pallet 2B.

③ The lifting levers 120 of the upper stage pallet lift 103 can be engaged with and disengaged from the corresponding upper stage pallet 2B on the lower stage pallet load 1A in an engaging/disengaging path avoiding the interference with the lower stage load appearance correcting unit 106. The upper stage pallet lift 103 thus can let the lifting levers 120 be reliably engaged with and disengaged from the upper stage pallet 2B, thus permitting the pallet 2B to be raised and lowered.

Figure 20A:
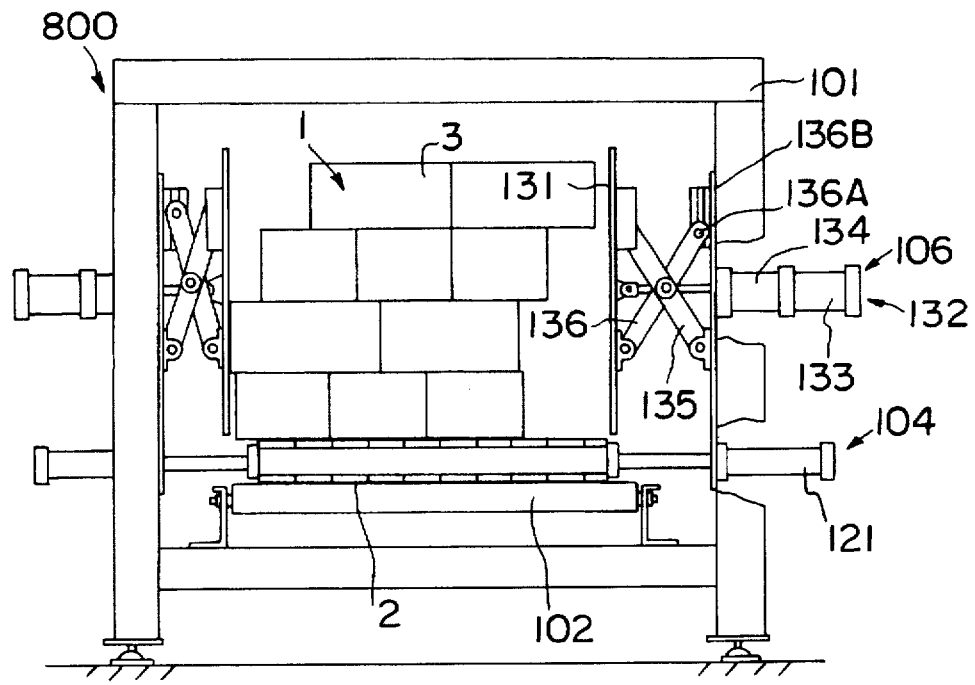
FIGS. 20 (A) and (B) are schematic views showing a further load appearance correcting unit.
Figure 20B:
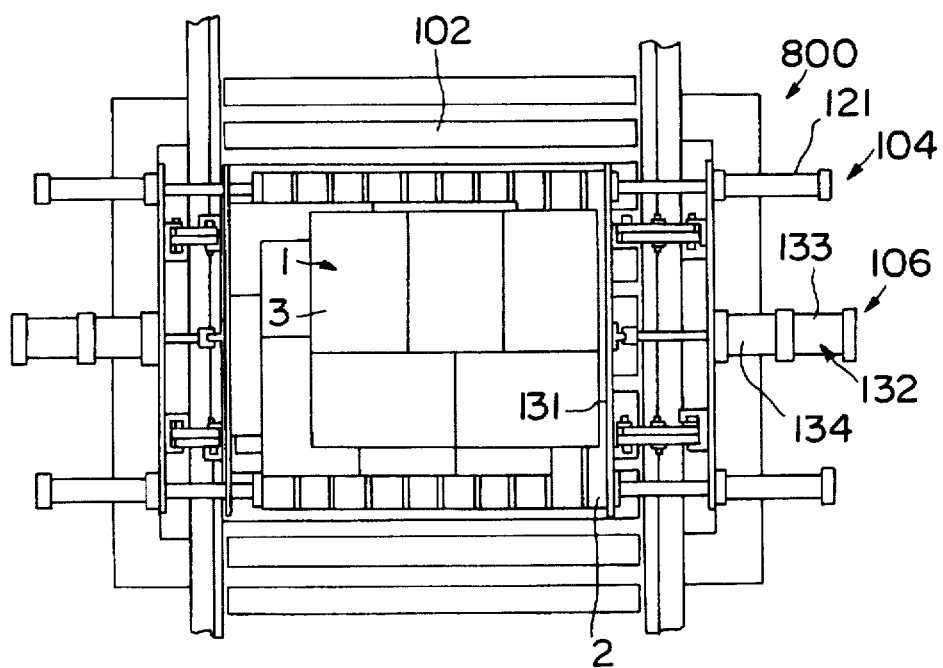

In the X- and Y-direction load appearance correcting units 100 and 200, the load appearance correction plates 131 and 141 perform a two-stage pushing operation. Thus, when loads are deviated beyond the pallets 2A and 2B as shown in FIG. 20(A), the load appearance correction plates 131 and 141 that are found on the side of the loads extending beyond the pallets first strike the loads. Thus, even if the load appearance correction plates 131 and 141 are moved slowly due to the resistance offered by the loads, they will not complete the clamping of the loads during the first pushing operation. Thus, at the time of the completion of the first stage pushing operation, the two load appearance correction plates 131 and 141 reaches the first pushing position to be coincident with the edges of the pallets 2A and 2B (see FIG. 20(B)).

In the second stage pushing operation, the load appearance correction plates 131 and 141 complete the clamping of the load within the width of the pallets 2A and 2B (see FIG. 20(C)). That is, the load that has been appearance corrected, is accommodated with the opposite side within the width of the pallets 2A and 2B (see FIG. 29(C)).

That is, in the first stage pushing operation, the load has its one side pushed by either of the load appearance correction plates 131 and 141 so that it is held within the edges of the pallets 2A and 2B, and in the subsequent second stage pushing operation, its clamping is completed to complete the appearance correction.

(B) ① The stacked vertical stage loads 1 (1A and 1B) can be appearance corrected at a time. Thus, the operation of disassembling the stacked load 1 (1A, 1B) into single pallet loads 1A and 1B in front of the load appearance correcting unit 100 is unnecessary, and a satisfactory warehousing operation can be obtained.

② Stacked loads 1A and 1B, in which the individual stage loads 3 are of the same kind, can be warehoused as the stack after the load appearance correction. That is, neither disassembling of the stack loads nor re-stacking thereof is involved, and satisfactory warehousing efficiency can be obtained.

③ The kinds and number of stack of loads to be warehoused can be readily recognized according to the outputs of the load kind discriminator 400 and the load appearance height sensor 300.

Figure 21A:
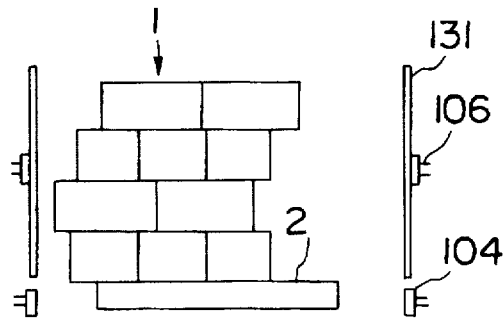
FIGS. 21 (A) to (D) are schematic views illustrating the principles underlying load appearance correction by the load appearance correcting unit.
Figure 21B:
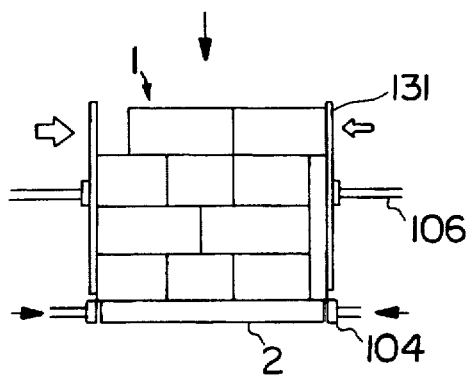
Figure 21C:
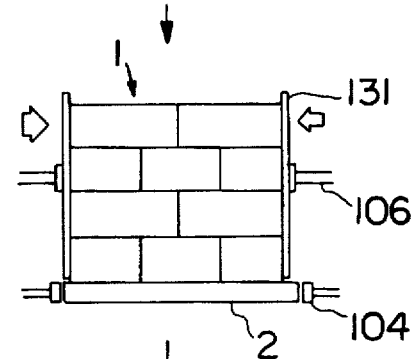
Figure 21D:
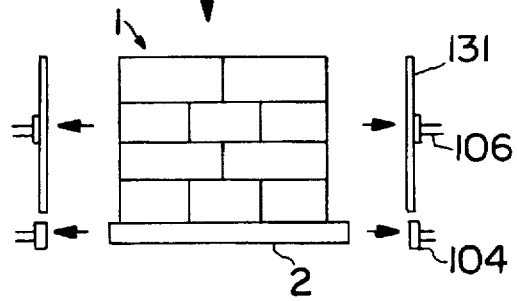
Figure 22A:
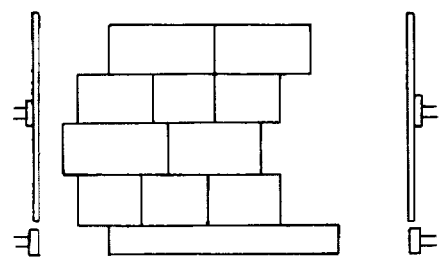
FIGS. 22 (A) to (C) are schematic views showing the principles underlying load appearance correction by the prior art load appearance correcting unit.
Figure 22B:
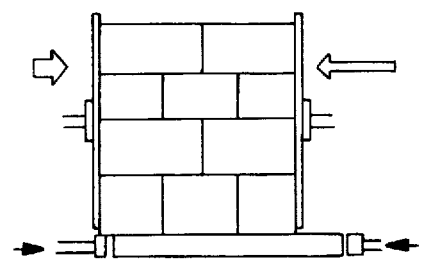
Figure 22C:
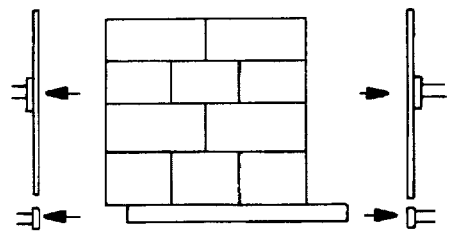
Figure 23A:
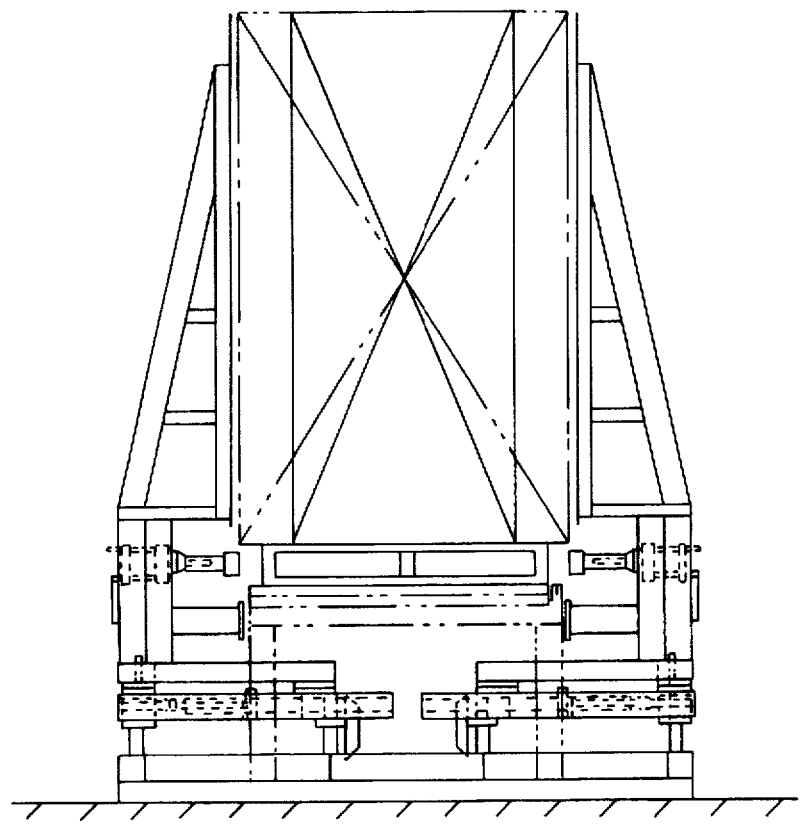
FIGS. 23 (A) and (B) are schematic views showing the prior art load appearance correcting unit.
Figure 23B:
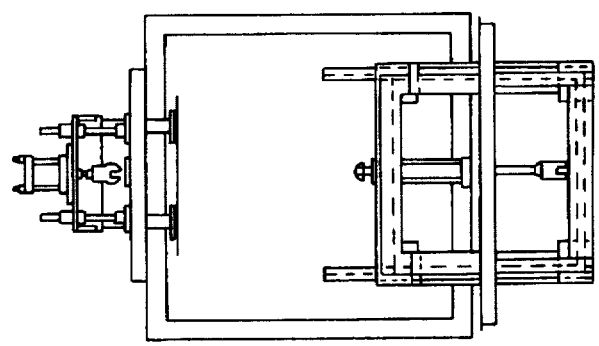

(C) The load appearance correction plates 131 and 141 perform a two-stage pushing operation. Thus, when the stacked load is deviated beyond the pallets 2A and 2B as shown in FIG. 21(A), the load appearance correction plates 131 and 141 that are on the side of the load extending beyond the load appearance correction plates 131 and 141, first strike the load, and even with subsequent slow movement of these load appearance correction plates 131 and 141, the load appearance correction plates 131 and 141 will not complete the clamping of the load in the first stage pushing operation. At the time of the completion of the first stage pushing operation, the load appearance correction plates 131 and 141 always reach the first pushing position to be coincident with the edges of the pallets 2A and 2B (see FIG. 21(B)).

In the second stage pushing operation, the load appearance correction plates 131 and 141 complete the clamping of the load within the width of the pallets 2A and 2B (see FIG. 21 (C)). Thus, the load that has been appearance corrected, is accommodated with the opposite side within the width of the pallets 2A and 2B (see FIG. 21(D)).

That is, in the first stage pushing operation, the load appearance correction plates 131 and 141 hold the load within the edges of the pallets 2A and 2B, and in the subsequent second stage pushing operation, they complete the clamping of the load to effect the appearance correction thereof.

(D) In the X-direction load appearance correcting unit 100, the pair lifting levers 120 are first provisionally set to the level of the through hole 2C of the pallet 2B that is determined according to data about the pallet load 1, etc. In this state, it is tried if light emitted from the upper and lower light-emitting elements 152A and 152B provided on the upper and lower surfaces of one of the lifting levers 120 can be received by the upper and lower light-receiving elements 153A and 153B provided on the upper and lower surfaces of the other lifting lever 120. If both the upper and lower light-receiving elements 153A and 153B are "on", it is obvious that the upper and lower surfaces of the lifting levers 120 can be accommodated in the through hole 2C. Thus, the lifting levers 120 can be reliably inserted in the through hole 2C of the pallet, thus permitting the raising or lowering operation.

Figure 16A:
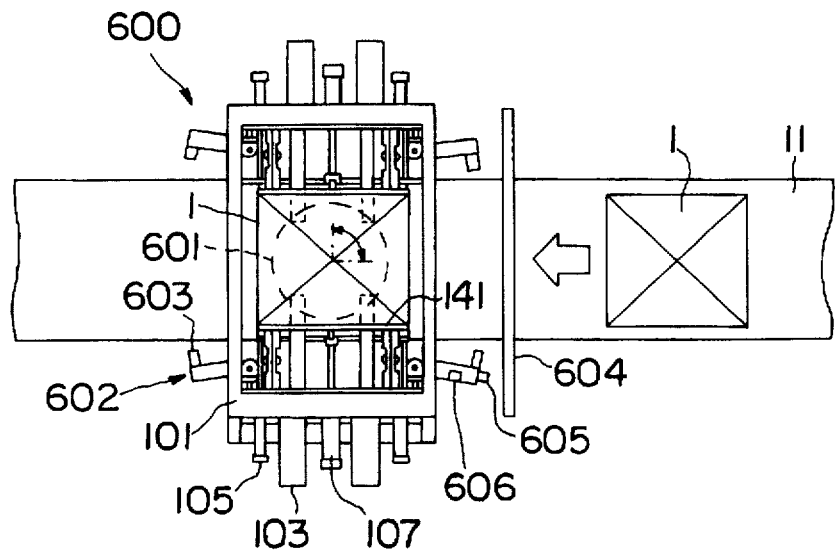
FIGS. 16 (A) and (B) are schematic views showing a different load appearance correcting unit.
Figure 16B:
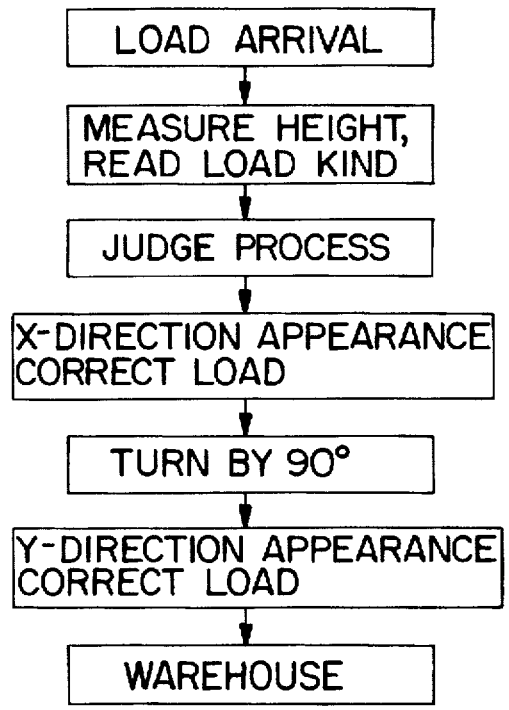

FIG. 16 shows a load appearance correcting unit 600, which, like the X-direction load appearance correcting unit 100 noted above, has a frame 101 having an X-direction upper stage pallet lift 103, a lower stage pallet securing unit 104, an upper stage pallet securing unit 105, a lower stage load appearance correcting unit 106 and an upper stage load correcting unit 107. The load appearance correcting unit 600 is different from the X-direction load appearance correcting unit 100 in that it has a turntable 601 in place of the feed roller 102 and also a Y-direction upper stage pallet lift 602. Thus, it is possible to obtain the appearance correction of both the pallet load 1 both in the X- and Y-directions with a single appearance correcting unit.

The turntable 601 can turn the pallet load 1 at least by 90 degrees.

In the Y-direction upper stage pallet lift 602, the lifting levers 603 which can be turned by lifting lever operation cylinders (not shown), can be engaged in and disengaged from the through hole 2C penetrating the upper stage pallet 2B in the X-direction, which has been turned by 90 degrees by the turntable 601.

Thus, in the load appearance correcting unit 600, ① the upper and lower pallet loads 1A and 1B are appearance corrected in the X-direction with the upper and lower pallet securing units 104 and 105 and upper and lower load appearance correcting units 106 and 107 in a stage with the upper stage pallet load 1B separated to be above the lower stage pallet load 1A that is obtained by raising the upper stage pallet 2B with the lifting levers 120 of the X-direction upper stage pallet lift 103 inserted in the through hole 2C of the upper stage pallet 2B that rested on the lower stage pallet load 1A in the two-stage stack of pallet loads 1 on the turntable 601. Then, ② the upper and lower pallet loads 1A and 1B that have been appearance corrected in the X-direction are returned to the turntable 601 and then turned by 90 degrees with the turning of the turntable 601. Then, ③ the upper and lower pallet loads 1A and 1B are appearance corrected in the Y-direction with the upper and lower pallet securing units 104 and 105 and upper and lower load appearance correcting units 106 and 107 in a state with the upper stage pallet load 1B separated upward from the lower stage pallet load 1A that is obtained by raising the upper stage pallet 2B with the lifting levers 603 of the Y-direction upper stage pallet 602 in the through hole 2C of the upper stage pallet 2B on the lower stage pallet load 1A of the two-stage stack of pallet loads 1 having been turned by 90 degrees (i.e., the same through hole 2C as that, in which the lifting levers 120 of the X-direction upper stage pallet lift 103 was inserted in ① above). Then ④ the pallet loads 1A and 1B that have been appearance corrected in the Y-direction are returned onto the turntable 601, thus bringing an end to the load appearance correction in both the X- and Y-directions.

As shown, with the load appearance correcting unit 600, it is possible to obtain appearance correction of the pallet load 1 which uses two side insertion pallets 2A and 2B in both the X- and Y-directions with a single load appearance correcting unit.

Further, in the load appearance correcting unit 600, a load appearance height sensor 604 is provided at the inlet side, and the lifting levers 603 of the Y-direction upper stage pallet lift 602 are provided with a lower and an upper stage load kind reader 605 and 606. Like the warehousing equipment 10 noted above, proper appearance correction operation is done with respect to various appearances a to f of the pallet load 1 (see FIG. 9) by determining the appearance of the pallet load 1 according to the outputs of the load appearance height sensor 604 and load kind readers 605 and 606 (see FIG. 16(B)). Thus, if it is found after the appearance correction in the X- and Y-directions in ④ above that the upper and lower stage loads are of the same kind, the upper and lower stage pallet loads 1A and 1B are returned in the stacked state on the turntable 601 and warehoused at a time. If the loads are of different kinds, the lower stage pallet load 1A first returned to the turntable 601 and paid out, and then the upper stage pallet 1B is returned to the turntable 601 and paid out. At this time, the lifting levers 603 of the Y-direction upper stage pallet lift 602 are lowered to the turntable 601 without buffering with the lower stage load correcting unit 106 for transferring the upper stage pallet 1B to the turntable 601.

FIG. 17 shows a further load appearance correcting unit 700, which, like the Y-direction load appearance correcting unit 200, has its frame 201 provided with an upper stage pallet lifting unit 203, a lower stage pallet securing unit 204, an upper stage pallet securing unit 205, a lower stage load correcting unit 206 and an upper stage load correcting unit 207. The load appearance correcting unit 700 is different from the Y-direction load appearance correcting unit 200 in that a turntable 701 is provided in lieu of the feed roller 202. Thus, when four side insertion pallets are used as the pallets 2A and 2B, with the load appearance correcting unit 700, it is possible to appearance correct the pallet load 1 in both the X- and Y-directions with a single load appearance correcting unit.

The turntable 701 turns the pallet load 1 at least by 90 degrees.

Thus, in the load appearance correcting unit 700, ① the upper and lower pallet loads 1A and 1B are appearance corrected in the X-direction with the upper and lower pallet securing units 204 and 205 and upper and lower load appearance correcting units 206 and 207 in a state with the upper stage pallet load 1B separated upward from the lower stage pallet load 1A that has been obtained by raising the upper stage pallet 2B with lifting levers 220 of the upper stage pallet lift 203 inserted in the X-direction through hole 2C of the upper stage pallet 2B resting on the lower stage pallet load 1A of the two-stage stack load 1 that has been arrived at the turntable 701. Then, ② the pallet loads 1A and 1B that have been appearance corrected in the X-direction are returned to the turntable 701 and then turned by 90 degrees with the turning of the turntable 701. Then, ③ the upper and lower pallet loads 1A and 1B are appearance corrected in the Y-direction with the upper and lower pallet securing units 204 and 205 and upper and lower load appearance correcting units 206 and 207 in a state with the upper stage pallet load 1B separated upward from the lower stage pallet load 1A that has been obtained by raising the upper stage pallet 2B by inserting the lifting levers 220 of the upper stage pallet lift 203 in the Y-direction through hole 2C in the upper stage pallet 21 resting on the lower stage pallet load 1A of the two-stage stack pallet loads 1 having been turned by 90 degrees. Then, ④ the pallet loads 1A and 1B that have been appearance corrected in the Y-direction are returned to the turntable 701, thus bringing an end to the appearance correction in the X- and Y-directions.

It will be seen that the load appearance correcting unit 700 can appearance correct the pallet loads 1, which use the four side insertion pallets 2A and 2B in both the X- and Y-directions with a single load appearance correcting unit.

Further, in the load appearance correcting unit 700, a load appearance height sensor 704 is provided on the inlet side, and the lifting levers 220 of the upper stage pallet lift 203 are provided with a lower stage load kind reader 705 and an upper stage load kind reader 706. Like the warehousing equipment 10 described before, proper appearance correcting operation is performed with respect to the various load appearances a to f (see FIG. 9) of the load 1 by determining the appearance of the pallet load 1 according to the outputs of the load appearance height sensor 704 and the load kind discriminators 705 and 706 (see FIG. 16(B)). Thus, if it is found after the appearance corrections in the X- and Y-directions in ④ that the upper and lower stage loads are of the same kind, the pallet loads 1A and 1B are returned in the stacked state to the turntable 701 and warehoused at a time. If the upper and lower stage loads are of different kinds, the lower stage pallet load 1A is first returned to the turntable 701 and paid out, and then the upper stage pallet load 1B is returned to the turntable 701 and paid out. At this time, the lifting levers 220 of the upper stage pallet lift 203 are lowered toward the turntable 701 without buffering with the lower stage load appearance correcting unit 206, thus permitting the upper stage pallet load 1B to be transferred to the turntable 701.

In the above X-direction load appearance correcting unit 100, it is also possible to use a turntable in lieu of the feed roller 102. In this case, however, the upper and lower pallet loads 1A and 1B which are of different kinds can not be separated from the state of the two-stage stack after their appearance correction.

FIGS. 18 and 19 show modifications of the pushers, which can push the load appearance correction plates in the two-stage pushing operation in the load appearance correcting unit 100 (or 200).

In the case of FIG. 18, a first and a second pushing cylinder 133 and 134 are provided separately and connected in series. More specifically, the first pushing cylinder 133 is secured to the frame 101, the second pushing cylinder 134 is secured to a movable base 133A which is coupled to the piston rod of the first pushing cylinder 133, and the load appearance correction plate 131 is coupled to the piston rod of the second pushing cylinder 134. The movable base 133A can run along a guide rail 133C provided on the frame 101 via its wheels 133B.

In the case of FIG. 19, the lower stage pallet securing cylinder 121 also serves as the first pushing cylinder 133. More specifically, a support bracket 134A is provided on a pallet securement member 104A that is coupled to the piston rod of the first pushing/pallet securing cylinder 121, the second pushing cylinder 134 is secured to the support bracket 134A, and the load appearance correction plate 131 is coupled to the piston rod of the second pushing cylinder 134. In this case, the operation of the first pushing/pallet securing cylinder 121 brings about an operation of securing the lower pallet and the first pushing operation of the pushers.

FIG. 20 shows a load appearance correcting unit 800, which can appearance correct only a single stage load, i.e., a single pallet load 1.

In the load appearance correcting unit 800, the X-direction load appearance correcting unit 100 has a frame 101, a feed roller 102, a lower stage pallet securing unit 104, and a lower stage load correcting unit 106. In this unit, the upper stage pallet lift 103, upper stage pallet securing unit 105 and upper stage load appearance correcting unit 107 are removed.

The present invention is applicable not only to the appearance correction of pallet loads but also broadly to the appearance correction of loads in load setting areas in a predetermined range.

Further, the present invention is applicable not only to load appearance correcting units but also broadly to apparatuses, in which pallets are raised and lowered.

INDUSTRIAL APPLICABILITY

As has been described in the foregoing, according to the present invention, it is possible to appearance correct a plurality of stacked pallet loads.

Further, according to the present invention, the efficiency of warehousing of stacked loads can be improved.

Further, according to the present invention, the appearance of load in a load setting area can be corrected to be reliably accommodated within the width of the load setting area.

Further, according to the present invention, the lifting levers of the pallet lift can be reliably inserted into the through hole in the pallet to raise and lower the pallet.

What is claimed is:

1. An automated warehousing apparatus for receiving a plurality of individual, vertically stacked load stages, each of said stages comprising a load placed on a pallet, wherein each of said individual load stages is imputed with a load kind, the apparatus comprising:

load appearance correcting means for correcting the appearance of the individual load stages one at a time;

load kind discriminator means for discriminating the kind of each stage load; and warehousing process controller means for warehousing said loads, said warehousing process controller means operatively connected to said discriminator means such that when said discriminator means determines that the loads in the individual load stages are of the same kind, the process controller means allows the individual load stages to be warehoused in the form of a stack, and when said discriminator means determines that the loads in the individual load stages are of different kinds, said process controller means allows warehousing of the loads after disassembling the stack into respective loads of different kinds.

2. The automated warehousing apparatus according to claim 1, further comprising load appearance height sensor means for detecting the height of the load appearance in each stage, wherein the height of the load appearance corresponds to a quantity of the load in each stage, the warehousing process controller capable of recognizing the kinds and quantities of loads to be warehoused according to the outputs of the load kind discriminator and the load appearance height sensor.

* * * * *